US009393487B2

(12) United States Patent
Zalewski et al.

(10) Patent No.: US 9,393,487 B2
(45) Date of Patent: *Jul. 19, 2016

(54) METHOD FOR MAPPING MOVEMENTS OF A HAND-HELD CONTROLLER TO GAME COMMANDS

(75) Inventors: Gary M. Zalewski, Oakland, CA (US); Richard Marks, Foster City, CA (US); Xiadong Mao, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 185 days.

This patent is subject to a terminal disclaimer.

(21) Appl. No.: 11/382,039

(22) Filed: May 7, 2006

(65) Prior Publication Data

US 2006/0287087 A1    Dec. 21, 2006

Related U.S. Application Data

(63) Continuation-in-part of application No. 11/381,721, filed on May 4, 2006, and a continuation-in-part of application No. 10/207,677, filed on Jul. 27, 2002, now Pat. No. 7,102,615, and a continuation-in-part of (Continued)

(51) Int. Cl.
*A63F 13/00* (2006.01)
*A63F 9/24* (2006.01)
*A63F 13/20* (2014.01)
*A63F 13/211* (2014.01)
*A63F 13/22* (2014.01)

(52) U.S. Cl.
CPC ............... *A63F 13/06* (2013.01); *A63F 13/211* (2014.09); *A63F 13/22* (2014.09); *A63F 2300/105* (2013.01); *A63F 2300/1087* (2013.01); *A63F 2300/6045* (2013.01)

(58) Field of Classification Search
USPC ............................... 463/36–39; 345/156, 157
See application file for complete search history.

(56) References Cited

U.S. PATENT DOCUMENTS

| | | | |
|---|---|---|---|
| 3,270,564 A | 9/1966 | Evans | |
| 3,561,272 A | 2/1971 | Davis | |
| 3,943,277 A | 3/1976 | Everly et al. | |
| 4,263,504 A | 4/1981 | Thomas | |
| 4,274,631 A | 6/1981 | Hayazaki | |

(Continued)

FOREIGN PATENT DOCUMENTS

| | | |
|---|---|---|
| EP | 0353200 | 1/1990 |
| EP | 0750202 | 5/1998 |

(Continued)

OTHER PUBLICATIONS

U.S. Appl. No. 11/840,170, filed Aug. 16, 2007, Marks.

(Continued)

*Primary Examiner* — Steven J Hylinski
(74) *Attorney, Agent, or Firm* — Fitch, Even, Tabin & Flannery, LLP

(57) ABSTRACT

One embodiment provides a method for use in a game that includes the steps of receiving position information for a controller that is being manipulated by a user, analyzing the position information to determine whether a predetermined movement of the controller associated with a command has been performed, and executing the command if the predetermined movement of the controller associated with the command has been performed.

11 Claims, 7 Drawing Sheets

Related U.S. Application Data application No. 10/650,409, filed on Aug. 27, 2003, now Pat. No. 7,613,310, and a continuation-in-part of application No. 10/663,236, filed on Sep. 15, 2003, now Pat. No. 7,883,415, and a continuation-in-part of application No. 10/759,782, filed on Jan. 16, 2004, now Pat. No. 7,623,115, and a continuation-in-part of application No. 10/820,469, filed on Apr. 7, 2004, now Pat. No. 7,970,147, and a continuation-in-part of application No. 11/301,673, filed on Dec. 12, 2005, now Pat. No. 7,646,372, and a continuation-in-part of application No. 11/381,728, filed on May 4, 2006, now Pat. No. 7,545,926, and a continuation-in-part of application No. 11/381,725, filed on May 4, 2006, now Pat. No. 7,783,061, and a continuation-in-part of application No. 11/381,727, filed on May 4, 2006, now Pat. No. 7,697,700, and a continuation-in-part of application No. 11/381,724, filed on May 4, 2006, now Pat. No. 8,073,157, and a continuation-in-part of application No. 11/381,729, filed on May 4, 2006, now Pat. No. 7,809,145.

(60) Provisional application No. 60/718,145, filed on Sep. 15, 2005.

(56) References Cited

U.S. PATENT DOCUMENTS

| | | |
|---|---|---|
| 4,313,227 A | 1/1982 | Eder |
| 4,363,484 A | 12/1982 | Breslow et al. |
| 4,469,330 A | 9/1984 | Asher |
| 4,558,864 A | 12/1985 | Medwedeff |
| 4,565,999 A | 1/1986 | King et al. |
| 4,683,891 A | 8/1987 | Cornellier et al. |
| 4,718,663 A | 1/1988 | Shepherd |
| 4,739,128 A | 4/1988 | Grisham |
| 4,787,051 A | 11/1988 | Olson |
| 4,796,019 A | 1/1989 | Auerbach |
| 4,802,227 A | 1/1989 | Elko et al. |
| 4,823,001 A | 4/1989 | Kobayashi et al. |
| 4,843,568 A | 6/1989 | Krueger et al. |
| 4,963,858 A | 10/1990 | Chien |
| 4,977,404 A | 12/1990 | Durst et al. |
| 5,034,986 A | 7/1991 | Karmann et al. |
| 5,046,739 A | 9/1991 | Reichow |
| 5,055,840 A | 10/1991 | Bartlett |
| 5,111,401 A | 5/1992 | Everett et al. |
| 5,128,671 A | 7/1992 | Thomas, Jr. |
| 5,144,594 A | 9/1992 | Gilchrist |
| 5,195,179 A | 3/1993 | Tokunaga |
| 5,214,615 A | 5/1993 | Bauer |
| 5,227,985 A * | 7/1993 | DeMenthon .............. 702/153 |
| 5,233,544 A | 8/1993 | Kobayashi |
| 5,260,556 A | 11/1993 | Lake et al. |
| 5,262,777 A | 11/1993 | Low et al. |
| 5,296,871 A | 3/1994 | Paley |
| 5,297,061 A | 3/1994 | Dementhon et al. |
| D345,994 S | 4/1994 | Shian |
| 5,331,583 A | 7/1994 | Hara et al. |
| 5,335,011 A | 8/1994 | Addeo et al. |
| 5,388,059 A | 2/1995 | DeMenthon |
| 5,394,168 A | 2/1995 | Smith, III et al. |
| 5,404,305 A | 4/1995 | Stiles, Jr. |
| 5,412,619 A | 5/1995 | Bauer |
| 5,426,450 A | 6/1995 | Drumm |
| 5,435,554 A | 7/1995 | Lipson |
| 5,440,326 A | 8/1995 | Quinn |
| 5,453,758 A | 9/1995 | Sato |
| 5,454,043 A | 9/1995 | Freeman |
| 5,455,685 A | 10/1995 | Mori |
| 5,473,701 A | 12/1995 | Cezanne et al. |
| 5,485,273 A | 1/1996 | Mark et al. |
| 5,517,333 A | 5/1996 | Tamura et al. |
| 5,524,637 A | 6/1996 | Erickson |
| 5,528,265 A | 6/1996 | Harrison |
| 5,534,917 A | 7/1996 | MacDougall |
| 5,543,818 A | 8/1996 | Scott |
| 5,551,693 A | 9/1996 | Goto et al. |
| 5,554,033 A | 9/1996 | Bizzi et al. |
| 5,554,980 A | 9/1996 | Hashimoto et al. |
| 5,557,684 A | 9/1996 | Wang et al. |
| 5,563,988 A | 10/1996 | Maes et al. |
| 5,568,928 A | 10/1996 | Munson et al. |
| 5,570,113 A | 10/1996 | Zetts |
| 5,581,276 A | 12/1996 | Cipolla et al. |
| 5,583,478 A | 12/1996 | Renzi |
| 5,586,231 A | 12/1996 | Florent et al. |
| 5,592,401 A * | 1/1997 | Kramer .............. 702/153 |
| 5,611,000 A | 3/1997 | Szeliski et al. |
| 5,611,731 A | 3/1997 | Bouton et al. |
| 5,616,078 A | 4/1997 | Oh |
| 5,626,140 A | 5/1997 | Feldman et al. |
| D380,238 S | 6/1997 | Tyler |
| 5,638,228 A | 6/1997 | Thomas et al. |
| 5,643,087 A | 7/1997 | Marcus et al. |
| 5,645,277 A | 7/1997 | Cheng |
| 5,649,021 A | 7/1997 | Matey et al. |
| 5,659,335 A | 8/1997 | Partridge |
| 5,675,825 A | 10/1997 | Dreyer et al. |
| 5,675,828 A | 10/1997 | Stoel et al. |
| 5,677,710 A | 10/1997 | Thompson-Rohrlich |
| 5,703,623 A | 12/1997 | Hall et al. |
| 5,706,364 A | 1/1998 | Kopec et al. |
| 5,724,106 A | 3/1998 | Autry et al. |
| 5,768,415 A | 6/1998 | Jagadish et al. |
| 5,796,354 A | 8/1998 | Cartabiano et al. |
| 5,818,424 A | 10/1998 | Korth |
| 5,846,086 A | 12/1998 | Bizzi et al. |
| 5,850,222 A | 12/1998 | Cone |
| 5,850,473 A | 12/1998 | Andersson |
| 5,861,910 A | 1/1999 | McGarry et al. |
| 5,870,100 A | 2/1999 | DeFreitasi |
| 5,883,616 A | 3/1999 | Koizumi et al. |
| 5,889,505 A | 3/1999 | Toyama et al. |
| 5,889,672 A | 3/1999 | Schuler et al. |
| 5,900,863 A | 5/1999 | Numazaki |
| 5,903,257 A * | 5/1999 | Nishiumi et al. .............. 345/157 |
| 5,913,727 A | 6/1999 | Ahdoot |
| 5,914,723 A | 6/1999 | Gajewska |
| 5,917,493 A | 6/1999 | Tan et al. |
| 5,917,936 A | 6/1999 | Katto |
| 5,923,306 A | 7/1999 | Smith et al. |
| 5,923,318 A | 7/1999 | Zhai et al. |
| 5,929,444 A | 7/1999 | Leichner |
| 5,930,383 A | 7/1999 | Netzer |
| 5,930,741 A | 7/1999 | Kramer |
| 5,937,081 A | 8/1999 | O'Brill et al. |
| 5,959,596 A | 9/1999 | McCarten et al. |
| 5,963,145 A | 10/1999 | Escobosa |
| 5,963,250 A | 10/1999 | Parker et al. |
| 5,978,722 A | 11/1999 | Takasuka et al. |
| 5,991,693 A | 11/1999 | Zalewski |
| 5,993,314 A | 11/1999 | Dannenberg et al. |
| 6,009,210 A | 12/1999 | Kang |
| 6,014,167 A | 1/2000 | Suito et al. |
| 6,021,219 A | 2/2000 | Andersson et al. |
| 6,022,274 A | 2/2000 | Takeda et al. |
| 6,031,545 A | 2/2000 | Ellenby et al. |
| 6,031,934 A | 2/2000 | Ahmad et al. |
| 6,037,942 A | 3/2000 | Millington |
| 6,044,181 A | 3/2000 | Szeliski et al. |
| 6,049,619 A | 4/2000 | Anandan et al. |
| 6,055,330 A | 4/2000 | Eleftheriadis et al. |
| 6,056,640 A | 5/2000 | Schaaij |
| 6,057,909 A | 5/2000 | Yahav et al. |
| 6,061,055 A | 5/2000 | Marks |
| 6,067,468 A | 5/2000 | Korenman et al. |
| 6,069,594 A | 5/2000 | Barnes et al. |
| 6,072,494 A | 6/2000 | Nguyen |
| 6,075,895 A | 6/2000 | Qiao et al. |
| 6,078,789 A | 6/2000 | Bodenmann et al. |
| 6,083,353 A | 7/2000 | Alexander, Jr. |

(56) References Cited

U.S. PATENT DOCUMENTS

| | | | |
|---|---|---|---|
| 6,091,905 A | 7/2000 | Yahav et al. | |
| 6,094,625 A | 7/2000 | Ralston | |
| 6,097,369 A | 8/2000 | Wambach | |
| 6,100,517 A | 8/2000 | Yahav et al. | |
| 6,100,895 A | 8/2000 | Miura et al. | |
| 6,101,289 A | 8/2000 | Kellner | |
| 6,102,803 A | 8/2000 | Takeda et al. | |
| 6,115,052 A | 9/2000 | Freeman et al. | |
| 6,134,346 A | 10/2000 | Berman et al. | |
| 6,144,367 A | 11/2000 | Berstis | |
| 6,146,278 A | 11/2000 | Kobayashi | |
| 6,151,009 A | 11/2000 | Kanade et al. | |
| 6,157,368 A | 12/2000 | Faeger | |
| 6,160,540 A | 12/2000 | Fishkin et al. | |
| 6,166,744 A | 12/2000 | Jaszlics et al. | |
| 6,173,059 B1 | 1/2001 | Huang et al. | |
| 6,173,610 B1 | 1/2001 | Pace | |
| 6,175,343 B1 | 1/2001 | Mitchell et al. | |
| 6,184,863 B1 | 2/2001 | Sibert et al. | |
| 6,191,773 B1 | 2/2001 | Maruno et al. | |
| 6,195,104 B1 | 2/2001 | Lyons | |
| 6,203,432 B1 * | 3/2001 | Roberts et al. | 463/37 |
| 6,215,898 B1 | 4/2001 | Woodfill et al. | |
| 6,243,054 B1 | 6/2001 | DeLuca | |
| 6,243,074 B1 | 6/2001 | Fishkin et al. | |
| 6,243,491 B1 | 6/2001 | Andersson | |
| 6,259,431 B1 | 7/2001 | Futatsugi et al. | |
| 6,275,213 B1 | 8/2001 | Tremblay et al. | |
| 6,281,930 B1 | 8/2001 | Parker et al. | |
| 6,282,362 B1 | 8/2001 | Murphy et al. | |
| 6,295,064 B1 | 9/2001 | Yamaguchi | |
| 6,297,838 B1 | 10/2001 | Chang et al. | |
| 6,304,267 B1 | 10/2001 | Sata | |
| 6,307,549 B1 | 10/2001 | King et al. | |
| 6,307,568 B1 | 10/2001 | Rom | |
| 6,323,839 B1 | 11/2001 | Fukuda et al. | |
| 6,323,942 B1 | 11/2001 | Bamji | |
| 6,324,296 B1 | 11/2001 | McSheery et al. | |
| 6,326,901 B1 | 12/2001 | Gonzales | |
| 6,327,073 B1 | 12/2001 | Yahav et al. | |
| 6,331,911 B1 | 12/2001 | Manasseh et al. | |
| 6,338,485 B1 | 1/2002 | Huettlinger | |
| 6,346,929 B1 | 2/2002 | Fukushima et al. | |
| 6,351,661 B1 | 2/2002 | Cosman | |
| 6,352,516 B1 | 3/2002 | Pozos et al. | |
| 6,371,849 B1 | 4/2002 | Togami | |
| 6,375,572 B1 | 4/2002 | Masuyama | |
| 6,392,644 B1 | 5/2002 | Miyata et al. | |
| 6,393,142 B1 | 5/2002 | Swain et al. | |
| 6,394,897 B1 | 5/2002 | Togami | |
| 6,400,374 B2 | 6/2002 | Lanier | |
| 6,409,602 B1 | 6/2002 | Wiltshire et al. | |
| 6,411,392 B1 | 6/2002 | Bender et al. | |
| 6,411,744 B1 | 6/2002 | Edwards | |
| 6,417,836 B1 | 7/2002 | Kumar et al. | |
| 6,441,745 B1 | 8/2002 | Gates | |
| 6,441,825 B1 | 8/2002 | Peters | |
| 6,450,820 B1 | 9/2002 | Palsson et al. | |
| 6,473,516 B1 | 10/2002 | Kawaguchi et al. | |
| 6,489,946 B1 | 12/2002 | Takeda et al. | |
| 6,489,948 B1 | 12/2002 | Lau | |
| 6,498,628 B2 | 12/2002 | Iwamura | |
| 6,498,860 B1 | 12/2002 | Sasaki et al. | |
| 6,501,258 B1 | 12/2002 | Levitt et al. | |
| 6,504,535 B1 | 1/2003 | Edmark | |
| 6,513,160 B2 | 1/2003 | Dureau | |
| 6,515,669 B1 | 2/2003 | Mohri | |
| 6,516,466 B1 | 2/2003 | Jackson | |
| 6,519,359 B1 | 2/2003 | Nafis et al. | |
| 6,533,420 B1 | 3/2003 | Eichenlaub | |
| 6,542,927 B2 | 4/2003 | Rhoads | |
| 6,544,124 B2 | 4/2003 | Ireland et al. | |
| 6,545,661 B1 | 4/2003 | Goschy et al. | |
| 6,545,706 B1 | 4/2003 | Edwards et al. | |
| 6,546,153 B1 | 4/2003 | Hoydal | |
| 6,556,704 B1 | 4/2003 | Chen | |
| 6,559,813 B1 | 5/2003 | DeLuca et al. | |
| 6,567,071 B1 | 5/2003 | Curran et al. | |
| 6,573,883 B1 | 6/2003 | Bartlett | |
| 6,577,748 B2 | 6/2003 | Chang | |
| 6,580,414 B1 | 6/2003 | Wergen et al. | |
| 6,580,415 B1 | 6/2003 | Kato et al. | |
| 6,587,573 B1 | 7/2003 | Stam et al. | |
| 6,587,835 B1 | 7/2003 | Treyz et al. | |
| 6,593,956 B1 | 7/2003 | Potts et al. | |
| 6,595,642 B2 | 7/2003 | Wirth | |
| 6,597,342 B1 | 7/2003 | Haruta | |
| 6,611,141 B1 | 8/2003 | Schulz et al. | |
| 6,621,938 B1 | 9/2003 | Tanaka et al. | |
| 6,628,265 B2 | 9/2003 | Hwang | |
| 6,661,914 B2 | 12/2003 | Dufour | |
| 6,668,244 B1 | 12/2003 | Rourke et al. | |
| 6,674,415 B2 | 1/2004 | Nakamura et al. | |
| 6,676,522 B2 | 1/2004 | Rowe et al. | |
| 6,677,967 B2 | 1/2004 | Swano et al. | |
| 6,677,987 B1 | 1/2004 | Girod | |
| 6,692,359 B1 | 2/2004 | Williams et al. | |
| 6,699,123 B2 | 3/2004 | Matsuura et al. | |
| 6,709,108 B2 | 3/2004 | Levine et al. | |
| 6,712,703 B2 | 3/2004 | Miyamoto et al. | |
| 6,720,949 B1 | 4/2004 | Pryor et al. | |
| 6,727,988 B2 | 4/2004 | Kim et al. | |
| 6,741,741 B2 | 5/2004 | Farrell | |
| 6,746,124 B2 | 6/2004 | Fischer et al. | |
| 6,747,632 B2 | 6/2004 | Howard | |
| 6,749,510 B2 | 6/2004 | Giobbi | |
| 6,751,338 B1 | 6/2004 | Wallack | |
| 6,753,849 B1 | 6/2004 | Curran et al. | |
| 6,766,036 B1 | 7/2004 | Pryor | |
| 6,767,282 B2 | 7/2004 | Matsuyama et al. | |
| 6,769,769 B2 | 8/2004 | Podlleanu et al. | |
| 6,771,294 B1 | 8/2004 | Pulli et al. | |
| 6,772,057 B2 | 8/2004 | Breed et al. | |
| 6,774,939 B1 | 8/2004 | Peng | |
| 6,785,329 B1 | 8/2004 | Pan et al. | |
| 6,789,967 B1 | 9/2004 | Forester | |
| 6,791,531 B1 | 9/2004 | Johnston et al. | |
| 6,795,068 B1 | 9/2004 | Marks | |
| 6,809,776 B1 | 10/2004 | Simpson et al. | |
| 6,811,491 B1 | 11/2004 | Levenberg et al. | |
| 6,819,318 B1 | 11/2004 | Geng | |
| 6,846,238 B2 | 1/2005 | Wells | |
| 6,847,311 B2 | 1/2005 | Li | |
| 6,850,221 B1 | 2/2005 | Tickle | |
| 6,863,609 B2 | 3/2005 | Okuda et al. | |
| 6,870,526 B2 | 3/2005 | Zngf et al. | |
| 6,873,747 B2 | 3/2005 | Askary | |
| 6,881,147 B2 | 4/2005 | Naghi et al. | |
| 6,884,171 B2 | 4/2005 | Eck et al. | |
| 6,890,262 B2 | 5/2005 | Oishi et al. | |
| 6,917,688 B2 | 7/2005 | Yu et al. | |
| 6,919,824 B2 | 7/2005 | Lee | |
| 6,924,787 B2 | 8/2005 | Kramer et al. | |
| 6,928,180 B2 | 8/2005 | Stam et al. | |
| 6,930,725 B1 | 8/2005 | Hayashi | |
| 6,931,125 B2 | 8/2005 | Smallwood | |
| 6,931,596 B2 | 8/2005 | Gutta et al. | |
| 6,940,538 B2 | 9/2005 | Rafey et al. | |
| 6,943,776 B2 | 9/2005 | Ehrenburg | |
| 6,945,653 B2 | 9/2005 | Kobori et al. | |
| 6,947,576 B2 | 9/2005 | Stam et al. | |
| 6,951,515 B2 | 10/2005 | Ohshima et al. | |
| 6,952,198 B2 | 10/2005 | Hansen | |
| 6,965,362 B1 | 11/2005 | Ishizuka | |
| 6,970,183 B1 | 11/2005 | Monroe | |
| 6,990,639 B2 | 1/2006 | Wilson | |
| 6,990,681 B2 | 1/2006 | Wang et al. | |
| 7,006,009 B2 | 2/2006 | Newman | |
| 7,016,411 B2 | 3/2006 | Azuma et al. | |
| 7,016,532 B2 | 3/2006 | Boncyk et al. | |
| 7,023,475 B2 | 4/2006 | Bean et al. | |
| 7,030,856 B2 | 4/2006 | Dawson et al. | |
| 7,039,199 B2 | 5/2006 | Rui | |
| 7,039,253 B2 | 5/2006 | Matsuoka et al. | |

(56) References Cited

U.S. PATENT DOCUMENTS

| | | |
|---|---|---|
| 7,042,440 B2 | 5/2006 | Pryor et al. |
| 7,043,056 B2 | 5/2006 | Edwards et al. |
| 7,054,452 B2 | 5/2006 | Ukita |
| 7,059,962 B2 | 6/2006 | Watashiba |
| 7,061,507 B1 | 6/2006 | Tuomi et al. |
| 7,071,914 B1 | 7/2006 | Marks |
| 7,084,887 B1 | 8/2006 | Sato et al. |
| 7,090,352 B2 | 8/2006 | Kobor et al. |
| 7,098,891 B1 | 8/2006 | Pryor |
| 7,102,615 B2 | 9/2006 | Marks |
| 7,106,366 B2 | 9/2006 | Parker et al. |
| 7,113,635 B2 | 9/2006 | Robert et al. |
| 7,116,330 B2 | 10/2006 | Marshall et al. |
| 7,116,342 B2 | 10/2006 | Dengler et al. |
| 7,121,946 B2 | 10/2006 | Paul et al. |
| 7,139,767 B1 | 11/2006 | Taylor et al. |
| 7,148,922 B2 | 12/2006 | Shimada |
| 7,156,311 B2 | 1/2007 | Attia et al. |
| 7,158,118 B2 | 1/2007 | Liberty |
| 7,161,634 B2 | 1/2007 | Long |
| 7,164,413 B2 | 1/2007 | Davis et al. |
| 7,168,042 B2 | 1/2007 | Braun et al. |
| 7,174,312 B2 | 2/2007 | Harper et al. |
| 7,182,691 B1 | 2/2007 | Schena |
| 7,183,929 B1 | 2/2007 | Antebi et al. |
| 7,193,607 B2 | 3/2007 | Moore et al. |
| 7,212,308 B2 | 5/2007 | Morgan |
| 7,223,173 B2 | 5/2007 | Masuyama et al. |
| 7,224,384 B1 | 5/2007 | Iddan et al. |
| 7,227,526 B2 | 6/2007 | Hildreth et al. |
| 7,227,976 B1 | 6/2007 | Jung et al. |
| 7,233,316 B2 | 6/2007 | Smith et al. |
| 7,239,301 B2 | 7/2007 | Liberty et al. |
| 7,245,273 B2 | 7/2007 | Eberl et al. |
| 7,259,375 B2 | 8/2007 | Tichit et al. |
| 7,260,221 B1 | 8/2007 | Atsmon |
| 7,262,760 B2 | 8/2007 | Liberty |
| 7,263,462 B2 | 8/2007 | Funge et al. |
| 7,274,305 B1 | 9/2007 | Lutrell |
| 7,283,679 B2 | 10/2007 | Okada et al. |
| 7,296,007 B1 | 11/2007 | Funge et al. |
| 7,301,530 B2 | 11/2007 | Lee et al. |
| 7,301,547 B2 | 11/2007 | Martins et al. |
| 7,305,114 B2 | 12/2007 | Wolff et al. |
| 7,339,580 B2 | 3/2008 | Westerman et al. |
| 7,346,387 B1 | 3/2008 | Wachter et al. |
| 7,352,358 B2 | 4/2008 | Zalewski et al. |
| 7,352,359 B2 | 4/2008 | Zalewski et al. |
| 7,364,297 B2 | 4/2008 | Goldfain et al. |
| 7,379,559 B2 | 5/2008 | Wallace et al. |
| 7,391,409 B2 | 6/2008 | Zalewski et al. |
| 7,414,611 B2 | 8/2008 | Liberty |
| 7,432,910 B2 | 10/2008 | Shahoian |
| 7,436,887 B2 | 10/2008 | Yeredor et al. |
| 7,446,650 B2 | 11/2008 | Schofield et al. |
| 7,489,298 B2 | 2/2009 | Liberty et al. |
| 7,489,299 B2 | 2/2009 | Liberty et al. |
| 7,545,926 B2 | 6/2009 | Mao |
| 7,555,157 B2 | 6/2009 | Davidson et al. |
| 7,558,432 B2 | 7/2009 | Zaharia et al. |
| 7,558,698 B2 | 7/2009 | Funge et al. |
| 7,565,295 B1 | 7/2009 | Hernandez-Rebollar |
| 7,613,610 B1 | 11/2009 | Zimmerman et al. |
| 7,623,115 B2 | 11/2009 | Marks |
| 7,627,139 B2 | 12/2009 | Marks et al. |
| 7,636,645 B1 | 12/2009 | Yen et al. |
| 7,636,697 B1 | 12/2009 | Dobson et al. |
| 7,636,701 B2 | 12/2009 | Funge et al. |
| 7,646,372 B2 | 1/2010 | Marks et al. |
| 7,665,041 B2 | 2/2010 | Wilson et al. |
| 7,697,700 B2 | 4/2010 | Mao |
| 7,721,231 B2 | 5/2010 | Wilson |
| 7,737,944 B2 | 6/2010 | Harrison |
| 7,782,297 B2 | 8/2010 | Zalewski et al. |
| 7,826,641 B2 | 11/2010 | Mandella et al. |
| 7,843,429 B2 | 11/2010 | Pryor |
| 7,850,526 B2 | 12/2010 | Zalewski et al. |
| 7,918,733 B2 | 4/2011 | Zalewski et al. |
| 8,072,424 B2 | 12/2011 | Liberty |
| 8,096,880 B2 | 1/2012 | Jawad et al. |
| 8,179,366 B2 | 5/2012 | Richardson et al. |
| 8,310,656 B2 | 11/2012 | Zalewski |
| 8,313,380 B2 | 11/2012 | Zalewski et al. |
| 8,570,378 B2 | 10/2013 | Zalewski et al. |
| 8,781,151 B2 | 7/2014 | Marks et al. |
| 2001/0011995 A1 | 8/2001 | Hinckley et al. |
| 2001/0024973 A1 | 9/2001 | Meredith |
| 2001/0056477 A1 | 12/2001 | McTernan et al. |
| 2002/0010655 A1 | 1/2002 | Kjallstrom |
| 2002/0022519 A1 | 2/2002 | Ogino |
| 2002/0023027 A1 | 2/2002 | Simonds |
| 2002/0024500 A1 | 2/2002 | Howard |
| 2002/0036617 A1* | 3/2002 | Pryor ............................ 345/156 |
| 2002/0041327 A1 | 4/2002 | Hildreth et al. |
| 2002/0049530 A1 | 4/2002 | Poropat |
| 2002/0056114 A1 | 5/2002 | Fillebrown et al. |
| 2002/0061739 A1 | 5/2002 | Nakamura et al. |
| 2002/0071036 A1 | 6/2002 | Gonzales et al. |
| 2002/0072414 A1 | 6/2002 | Stylinski et al. |
| 2002/0075286 A1 | 6/2002 | Yonezawa et al. |
| 2002/0083461 A1 | 6/2002 | Hutcheson et al. |
| 2002/0085097 A1 | 7/2002 | Colmenarez et al. |
| 2002/0089412 A1 | 7/2002 | Heger et al. |
| 2002/0094189 A1 | 7/2002 | Navab et al. |
| 2002/0110273 A1 | 8/2002 | Dufour |
| 2002/0126899 A1 | 9/2002 | Farrell |
| 2002/0134151 A1 | 9/2002 | Naruoka et al. |
| 2002/0158873 A1 | 10/2002 | Williamson |
| 2002/0171622 A1 | 11/2002 | Shen et al. |
| 2002/0171625 A1 | 11/2002 | Rothchild |
| 2003/0014212 A1 | 1/2003 | Ralston et al. |
| 2003/0020718 A1 | 1/2003 | Marshall et al. |
| 2003/0022716 A1 | 1/2003 | Park et al. |
| 2003/0032466 A1 | 2/2003 | Watashiba |
| 2003/0032484 A1 | 2/2003 | Ohshima et al. |
| 2003/0034961 A1 | 2/2003 | Kao |
| 2003/0038778 A1 | 2/2003 | Noguera |
| 2003/0038933 A1 | 2/2003 | Shirley et al. |
| 2003/0063065 A1 | 4/2003 | Lee et al. |
| 2003/0064712 A1 | 4/2003 | Gaston et al. |
| 2003/0073492 A1 | 4/2003 | Tosaki et al. |
| 2003/0092493 A1 | 5/2003 | Shimizu et al. |
| 2003/0093591 A1 | 5/2003 | Hohl |
| 2003/0096650 A1 | 5/2003 | Eguchi et al. |
| 2003/0100363 A1 | 5/2003 | Ali |
| 2003/0123705 A1 | 7/2003 | Stam et al. |
| 2003/0128187 A1* | 7/2003 | Strubbe ........................ 345/157 |
| 2003/0160862 A1 | 8/2003 | Charlier et al. |
| 2003/0160970 A1 | 8/2003 | Basu et al. |
| 2003/0169233 A1 | 9/2003 | Hansen |
| 2003/0193572 A1 | 10/2003 | Wilson et al. |
| 2003/0232649 A1 | 12/2003 | Gizis et al. |
| 2004/0001082 A1 | 1/2004 | Said |
| 2004/0017355 A1 | 1/2004 | Shim |
| 2004/0023736 A1 | 2/2004 | Cardinale |
| 2004/0029640 A1 | 2/2004 | Masuyama et al. |
| 2004/0035925 A1 | 2/2004 | Wu et al. |
| 2004/0046736 A1 | 3/2004 | Pryor et al. |
| 2004/0047464 A1 | 3/2004 | Yu et al. |
| 2004/0054512 A1 | 3/2004 | Kim et al. |
| 2004/0063480 A1 | 4/2004 | Wang |
| 2004/0063481 A1 | 4/2004 | Wang |
| 2004/0063502 A1 | 4/2004 | Hussaini et al. |
| 2004/0070564 A1 | 4/2004 | Dawson et al. |
| 2004/0070565 A1 | 4/2004 | Nayar et al. |
| 2004/0087366 A1 | 5/2004 | Shum et al. |
| 2004/0095327 A1 | 5/2004 | Lo |
| 2004/0104891 A1 | 6/2004 | Sacca et al. |
| 2004/0140955 A1 | 7/2004 | Metz |
| 2004/0150728 A1 | 8/2004 | Ogino |
| 2004/0155962 A1 | 8/2004 | Marks |
| 2004/0174473 A1 | 9/2004 | Cavanaugh et al. |
| 2004/0178576 A1 | 9/2004 | Hillis et al. |
| 2004/0180720 A1 | 9/2004 | Nashi et al. |

(56) References Cited

U.S. PATENT DOCUMENTS

| | | |
|---|---|---|
| 2004/0189720 A1 | 9/2004 | Wilson et al. |
| 2004/0204240 A1 | 10/2004 | Barney |
| 2004/0207597 A1 | 10/2004 | Marks |
| 2004/0212589 A1 | 10/2004 | Hall et al. |
| 2004/0213419 A1 | 10/2004 | Varma et al. |
| 2004/0222970 A1 | 11/2004 | Martinez et al. |
| 2004/0227725 A1 | 11/2004 | Calarco et al. |
| 2004/0239670 A1 | 12/2004 | Marks |
| 2004/0240542 A1 | 12/2004 | Yeredor et al. |
| 2004/0254017 A1 | 12/2004 | Cheng |
| 2004/0266528 A1 | 12/2004 | Wang |
| 2005/0009605 A1 | 1/2005 | Rosenberg et al. |
| 2005/0026684 A1 | 2/2005 | Sumi et al. |
| 2005/0037844 A1 | 2/2005 | Shum et al. |
| 2005/0047611 A1 | 3/2005 | Mao |
| 2005/0054457 A1 | 3/2005 | Eyestone et al. |
| 2005/0059488 A1 | 3/2005 | Larsen |
| 2005/0064936 A1 | 3/2005 | Pryor |
| 2005/0075167 A1 | 4/2005 | Beaulieu et al. |
| 2005/0085298 A1 | 4/2005 | Woolston |
| 2005/0088369 A1 | 4/2005 | Yoshioka |
| 2005/0102374 A1 | 5/2005 | Moragne et al. |
| 2005/0105777 A1 | 5/2005 | Koslowski et al. |
| 2005/0117045 A1 | 6/2005 | Abdellatif et al. |
| 2005/0157204 A1 | 7/2005 | Marks |
| 2005/0162384 A1 | 7/2005 | Yokoyama |
| 2005/0162385 A1 | 7/2005 | Doi et al. |
| 2005/0174324 A1 | 8/2005 | Liberty et al. |
| 2005/0181878 A1 | 8/2005 | Danieli et al. |
| 2005/0198095 A1 | 9/2005 | Du et al. |
| 2005/0215320 A1 | 9/2005 | Koay et al. |
| 2005/0226431 A1 | 10/2005 | Mao |
| 2005/0239548 A1 | 10/2005 | Ueshima et al. |
| 2005/0282603 A1 | 12/2005 | Parrott et al. |
| 2006/0025229 A1 | 2/2006 | Mahajan et al. |
| 2006/0028552 A1 | 2/2006 | Aggarwal et al. |
| 2006/0033713 A1 | 2/2006 | Pryor |
| 2006/0035710 A1 | 2/2006 | Festejo et al. |
| 2006/0038819 A1 | 2/2006 | Festejo et al. |
| 2006/0126900 A1 | 6/2006 | Mihara et al. |
| 2006/0139322 A1 | 6/2006 | Marks |
| 2006/0143571 A1 | 6/2006 | Chan |
| 2006/0166738 A1 | 7/2006 | Eyestone et al. |
| 2006/0183546 A1 | 8/2006 | Addington et al. |
| 2006/0204012 A1 | 9/2006 | Marks |
| 2006/0227211 A1 | 10/2006 | Kotake |
| 2006/0233389 A1 | 10/2006 | Mao |
| 2006/0239471 A1 | 10/2006 | Mao |
| 2006/0252474 A1 | 11/2006 | Zalewski |
| 2006/0252475 A1 | 11/2006 | Zalewski |
| 2006/0252477 A1 | 11/2006 | Zalewski |
| 2006/0252541 A1 | 11/2006 | Zalewski |
| 2006/0252543 A1 | 11/2006 | Van Noland et al. |
| 2006/0256081 A1 | 11/2006 | Zalewski |
| 2006/0264258 A1 | 11/2006 | Zalewski |
| 2006/0264259 A1 | 11/2006 | Zalewski |
| 2006/0264260 A1 | 11/2006 | Zalewski |
| 2006/0269072 A1 | 11/2006 | Mao |
| 2006/0269073 A1 | 11/2006 | Mao |
| 2006/0274032 A1 | 12/2006 | Mao et al. |
| 2006/0274911 A1 | 12/2006 | Mao |
| 2006/0277571 A1 | 12/2006 | Marks |
| 2006/0280312 A1 | 12/2006 | Mao |
| 2006/0281550 A1* | 12/2006 | Schena ............................ 463/37 |
| 2006/0282873 A1 | 12/2006 | Zalewski |
| 2006/0287084 A1 | 12/2006 | Mao |
| 2006/0287085 A1 | 12/2006 | Mao |
| 2006/0287086 A1 | 12/2006 | Zalewski |
| 2007/0015558 A1 | 1/2007 | Zalewski |
| 2007/0015559 A1 | 1/2007 | Zalewski |
| 2007/0021208 A1 | 1/2007 | Mao |
| 2007/0025562 A1 | 2/2007 | Zalewski |
| 2007/0060336 A1 | 3/2007 | Marks et al. |
| 2007/0061413 A1 | 3/2007 | Larsen |
| 2007/0066394 A1 | 3/2007 | Ikeda et al. |
| 2007/0072675 A1 | 3/2007 | Hammano et al. |
| 2007/0120834 A1 | 5/2007 | Boillot |
| 2007/0120996 A1 | 5/2007 | Boillot |
| 2007/0260340 A1 | 11/2007 | Mao |
| 2007/0260517 A1 | 11/2007 | Zalewski et al. |
| 2007/0261077 A1 | 11/2007 | Zalewski et al. |
| 2007/0270215 A1 | 11/2007 | Miyamoto et al. |
| 2007/0270217 A1 | 11/2007 | Rabin |
| 2007/0293317 A1 | 12/2007 | Sato et al. |
| 2008/0056561 A1 | 3/2008 | Sawachi |
| 2008/0070684 A1 | 3/2008 | Haigh-Hutchinson |
| 2008/0091421 A1 | 4/2008 | Gustavsson |
| 2008/0208613 A1 | 8/2008 | Scibora |
| 2009/0010494 A1 | 1/2009 | Bechtel et al. |
| 2009/0016642 A1 | 1/2009 | Hart |
| 2009/0067291 A1 | 3/2009 | Atsmon et al. |
| 2009/0118012 A1 | 5/2009 | Sternberg |
| 2009/0221368 A1 | 9/2009 | Yen et al. |
| 2009/0221374 A1 | 9/2009 | Yen et al. |
| 2009/0288064 A1 | 11/2009 | Yen et al. |
| 2010/0004896 A1 | 1/2010 | Yen et al. |
| 2010/0137064 A1 | 6/2010 | Shum et al. |
| 2011/0074669 A1 | 3/2011 | Marks et al. |
| 2011/0077082 A1 | 3/2011 | Marks et al. |
| 2011/0118021 A1 | 5/2011 | Zalewski et al. |
| 2014/0078312 A1 | 3/2014 | Zalewski et al. |

FOREIGN PATENT DOCUMENTS

| | | | |
|---|---|---|---|
| EP | 2780176 | 6/1998 | |
| EP | 0867798 | 9/1998 | |
| EP | 0613294 | 10/1998 | |
| EP | 1098686 | 5/1999 | |
| EP | 1074934 | 2/2001 | |
| EP | 1176559 A2 | 1/2002 | |
| EP | 1180384 | 2/2002 | |
| EP | 1206950 | 5/2002 | |
| EP | 0652686 | 8/2002 | |
| EP | 1279425 | 1/2003 | |
| EP | 1306112 | 5/2003 | |
| EP | 0869458 | 7/2003 | |
| EP | 1335338 | 8/2003 | |
| EP | 1358918 | 11/2003 | |
| EP | 1402929 A1 | 3/2004 | |
| EP | 1411461 | 4/2004 | |
| EP | 1435258 | 9/2004 | |
| EP | 0835676 | 10/2004 | |
| EP | 0823683 | 7/2005 | |
| EP | 1553486 A1 | 7/2005 | |
| EP | 1489596 | 9/2006 | |
| EP | 1033882 | 9/2009 | |
| EP | 1449358 B1 | 11/2011 | |
| FR | 2814965 | 4/2002 | |
| FR | 2832892 B1 | 4/2004 | |
| GB | 2206716 | 1/1989 | |
| GB | 2376397 | 12/2002 | |
| GB | 2388418 A | 11/2003 | |
| GB | 2398691 A | 8/2004 | |
| JP | 1138949 | 5/1989 | |
| JP | 1284897 | 11/1989 | |
| JP | 6-198075 A | 7/1994 | |
| JP | 06198075 A * | 7/1994 | ................ A63F 9/22 |
| JP | 6102980 | 12/1994 | |
| JP | 9128141 | 5/1997 | |
| JP | 9185456 | 7/1997 | |
| JP | 9-265346 A | 10/1997 | |
| JP | 2000-123186 A | 4/2000 | |
| JP | 2000/172431 | 6/2000 | |
| JP | 2000-259340 A | 9/2000 | |
| JP | 2000/259856 | 9/2000 | |
| JP | 2000/350859 | 12/2000 | |
| JP | 2001/166676 | 6/2001 | |
| JP | 2001-170358 A | 6/2001 | |
| JP | 2002-306846 A | 10/2002 | |
| JP | 2002306846 | 10/2002 | |
| JP | 2002320773 | 11/2002 | |
| JP | 2002/369969 | 12/2002 | |
| JP | 2003-78779 A | 3/2003 | |
| JP | 2003-126548 A | 5/2003 | |

(56) References Cited

FOREIGN PATENT DOCUMENTS

| JP | 2003135851 | | 5/2003 |
|---|---|---|---|
| JP | 2003-236244 | A | 8/2003 |
| JP | 2004/145448 | | 5/2004 |
| JP | 2004-336740 | A | 11/2004 |
| JP | 2005/046422 | | 2/2005 |
| JP | 2006-509548 | A | 3/2006 |
| JP | 2006-99468 | A | 4/2006 |
| JP | 2011-045780 | | 3/2011 |
| WO | WO 88/05942 | | 8/1988 |
| WO | WO 98/48571 | | 10/1998 |
| WO | WO 99/35633 | | 1/1999 |
| WO | WO 99/26198 | | 5/1999 |
| WO | WO 99/26198 | | 10/1999 |
| WO | WO 01/18563 | | 3/2001 |
| WO | WO 02/27456 | | 2/2002 |
| WO | WO 02/052496 | | 7/2002 |
| WO | WO 03/079179 | | 9/2003 |
| WO | 2004/041379 | A2 | 5/2004 |
| WO | 2004/073814 | A1 | 9/2004 |
| WO | 2004/073815 | A1 | 9/2004 |
| WO | 2005073838 | A2 | 8/2005 |
| WO | WO 2005/107911 | | 11/2005 |
| WO | 2005113086 | A1 | 12/2005 |
| WO | WO 2006/121896 | | 11/2006 |
| WO | WO 2007/095082 | | 8/2007 |
| WO | 2008056180 | A2 | 5/2008 |

OTHER PUBLICATIONS

U.S. Appl. No. 11/838,823, filed Aug. 14, 2007, Benoist.
U.S. Appl. No. 11/624,637, filed Jan. 18, 2007, Harrison.
U.S. Appl. No. 11/551,682, filed Oct. 20, 2006, Mondesir.
U.S. Appl. No. 11/551,197, filed Oct. 19, 2006, Mondesir.
U.S. Appl. No. 11/536,559, filed Sep. 28, 2006, Zalewski.
U.S. Appl. No. 11/382,699, filed May 10, 2006, Zalewski.
U.S. Appl. No. 29/259,348, filed May 6, 2006, Zalewski.
U.S. Appl. No. 29/259,349, filed May 6, 2006, Goto.
U.S. Appl. No. 29/259,350, filed May 6, 2006, Zalewski.
U.S. Appl. No. 60/798,031, filed May 6, 2006, Woodard.
U.S. Appl. No. 11/381,727, filed May 4, 2006, Mao.
U.S. Appl. No. 11/381,728, filed May 4, 2006, Mao.
U.S. Appl. No. 11/381,729, filed May 4, 2006, Mao.
U.S. Appl. No. 11/301,673, filed Dec. 12, 2005, Marks.
U.S. Appl. No. 60/718,145, filed Sep. 15, 2005, Hernandez-Abrego.
U.S. Appl. No. 60/678,413, filed May 5, 2005, Marks.
U.S. Appl. No. 29/246,743, filed May 8, 2006.
U.S. Appl. No. 29/246,744, filed May 8, 2006.
U.S. Appl. No. 29/246,759, filed May 8, 2006.
U.S. Appl. No. 29/246,762, filed May 8, 2006.
U.S. Appl. No. 29/246,763, filed May 8, 2006.
U.S. Appl. No. 29/246,764, filed May 8, 2006.
U.S. Appl. No. 29/246,765, filed May 8, 2006.
U.S. Appl. No. 29/246,766, filed May 8, 2006.
U.S. Appl. No. 29/246,767, filed May 8, 2006.
U.S. Appl. No. 29/246,768, filed May 8, 2006.
USPTO, Office Action from U.S. Appl. No. 11/382,043; U.S. Pub. No. US-2006-0264260-A1; mailed Feb. 5, 2008; 16 pages; FETF.
USPTO, Office Action from U.S. Appl. No. 11/382,699; U.S. Pub. No. US-2007-0265075-A1; mailed Feb. 14, 2008; 15 pages; FETF.
USPTO, Office Action from U.S. Appl. No. 11/536,559; mailed Dec. 10, 2007; 6 pages; FETF.
Naturalpoint Inc., "Vector Expansion QuickStart Guide v2", posted on the Internet Jan. 11, 2005, 1 page.
Naturalpoint Inc., "NaturalPoint TrackIR, Users Manual version 4.1.028", TrackIR 4:PRO :: TrackIR Manual 4.1.028, posted on the Internet Nov. 15, 2005, pp. 1-30.
Naturalpoint Inc., "TrackClip PRO Quick Start Guide", posted on the Internet Dec. 12, 2006, 1 page.
Naturalpoint Inc., "TrackIR Newsletter", Newsletters from TrackIR website: http://www.naturalpoint.com/trackir/04-community/newsletters/, dated Jan. 2005 through Sep. 2006 (printed from the Internet Mar. 7, 2008), pp. 1-48.
Naturalpoint Inc., "TrackIR : head tracking view control immersion for flight racing and action simulator", Pages from TrackIR website: http://www.naturalpoint.com/trackir/, Copyright Jul. 2005 (printed from the Internet Mar. 7, 2008), pp. 1-59.
USPTO; Office Action issued in U.S. Appl. No. 11/536,559; mailed Jun. 30, 2008; 8 pages.
USPTO; Office Action issued in U.S. Appl. No. 11/382,034; mailed Aug. 4, 2008; 14 pages.
Patent Cooperation Treaty; "International Search Report" issued in corresponding PCT/US07/67367; mailed Jun. 3, 2008; 2 pages.
Patent Cooperation Treaty; "Written Opinion of the International Searching Authority" issued in corresponding PCT/US07/67367; mailed Jun. 3, 2008; 5 pages.
Patent Cooperation Treaty; "Notification Concerning Transmittal of the International Search Report and the Written Opinion of the International Searching Authority or the Declaration" issued in corresponding PCT/US07/67367; mailed Jun. 3, 2008; 2 pages.
USPTO; Office Action issued in U.S. Appl. No. 11/382,037; mailed Oct. 2, 2008; 6 pages.
USPTO; Final Office Action issued in U.S. Appl. No. 11/382,043; mailed Sep. 4, 2008; 15 pages.
USPTO; Office Action issued in U.S. Appl. No. 11/382,259; mailed Sep. 15, 2008; 15 pages.
USPTO; Office Action issued in U.S. Appl. No. 11/382,258; mailed Sep. 17, 2008; 11 pages.
Patent Cooperation Treaty; "International Search Report" issued in PCT/US07/67697, which corresponds to U.S. Pub. No. 2007/0015558A1; mailed Sep. 15, 2008; 3 pages.
Patent Cooperation Treaty; "Written Opinion of the International Searching Authority" issued in PCT/US07/67697, which corresponds to U.S. Pub. No. 2007/0015558A1; mailed Sep. 15, 2008; 7 pages.
Patent Cooperation Treaty; "Notification Concerning Transmittal of the International Search Report and the Written Opinion of the International Searching Authority or the Declaration" issued in PCT/US07/67697, which corresponds to U.S. Pub. No. 2007/0015558A1; mailed Sep. 15, 2008; 1 page.
Patent Cooperation Treaty; "International Search Report" issued in PCT/US07/67961, which corresponds to U.S. Pub. No. 2006/0282873A1; mailed Sep. 16, 2008; 2 pages.
Patent Cooperation Treaty; "Written Opinion of the International Searching Authority" issued in PCT/US07/67961, which corresponds to U.S. Pub. No. 2006/0282873A1; mailed Sep. 16, 2008; 3 pages.
Patent Cooperation Treaty; "Notification Concerning Transmittal of the International Search Report and the Written Opinion of the International Searching Authority or the Declaration" issued in PCT/US07/67961, which corresponds to U.S. Pub. No. 2006/0282873A1; mailed Sep. 16, 2008; 1 page.
USPTO; Final Office Action issued in U.S. Appl. No. 11/536,559; mailed Sep. 15, 2008; 8 pages.
USPTO; Office Action issued in U.S. Appl. No. 11/624,637; mailed Oct. 1, 2008; 9 pages.
Patent Cooperation Treaty; "International Search Report" issued in PCT/US08/73196, which corresponds to U.S. Pub. No. 2008/0080789A1, U.S. Appl. No. 11/840,170; mailed Nov. 7, 2008; 2 pages.
Patent Cooperation Treaty; "Written Opinion of the International Searching Authority" issued in PCT/US08/73196, which corresponds to U.S. Pub. No. 2008/0080789A1, U.S. Appl. No. 11/840,170; mailed Nov. 7, 2008; 4 pages.
Patent Cooperation Treaty; "Notification Concerning Transmittal of the International Search Report and the Written Opinion of the International Searching Authority or the Declaration" issued in PCT/US08/73196, which corresponds to U.S. Pub. No. 2008/0080789A1, U.S. Appl. No. 11/840,170; mailed Nov. 7, 2008; 1 page.
USPTO; Final Office Action issued in U.S. Appl. No. 11/382,699; mailed Sep. 23, 2008; 11 pages.
Gary Zalewski; "Method and Apparatus for Tracking Three-Dimensional Movements of an Object Using a Depth Sensing Camera"; U.S. Appl. No. 12/262,044; filed Oct. 30, 2008; 76 pages.
USPTO; Office Action issued in U.S. Appl. No. 11/382,250; mailed Jul. 22, 2008; 11 pages.

(56) References Cited

OTHER PUBLICATIONS

USPTO; Final Office Action issued in U.S. Appl. No. 11/382,034; mailed Mar. 9, 2009; 28 pages.
USPTO; Office Action issued in U.S. Appl. No. 11/382,043; mailed Feb. 9, 2009; 20 pages.
USPTO; Office Action issued in U.S. Appl. No. 11/536,559; mailed Mar. 2, 2009; 8 pages.
USPTO; Final Office Action issued in U.S. Appl. No. 11/382,258; mailed Mar. 19, 2009; 14 pages.
USPTO; Final Office Action issued in U.S. Appl. No. 11/382,259; mailed Mar. 25, 2009; 17 pages.
USPTO; Final Office Action issued in U.S. Appl. No. 11/382,037; mailed May 11, 2009; 6 pages.
USPTO; Final Office Action issued in U.S. Appl. No. 11/382,043; mailed Aug. 21, 2009; 14 pages.
USPTO; Advisory Action issued in U.S. Appl. No. 11/382,259; mailed Jul. 7, 2009; 9 pages.
USPTO; Notice of Allowance and Fee(s) Due issued in U.S. Appl. No. 11/382,258; mailed Sep. 24, 2009; 7 pages.
USPTO; Advisory Action issued in U.S. Appl. No. 11/536,559; mailed Jan. 15, 2009; 3 pages.
USPTO; Final Office Action issued in U.S. Appl. No. 11/624,637; mailed Apr. 6, 2009; 19 pages.
USPTO; Office Action issued in U.S. Appl. No. 11/624,637; mailed Sep. 15, 2009; 11 pages.
USPTO; Office Action issued in U.S. Appl. No. 11/551,682; mailed May 26, 2009; 10 pages.
Nintendo; "Super Mario 64 Instruction Booklet"; released Jun. 1996; pp. 1-25 plus title pages (all included in the attached 14 page PDF).
USPTO; Advisory Action issued in U.S. Appl. No. 11/382,699; mailed Mar. 11, 2009; 3 pages.
USPTO; Office Action issued in U.S. Appl. No. 11/382,699; mailed Apr. 24, 2009; 11 pages.
USPTO; Office Action issued in U.S. Appl. No. 11/382,034; mailed Nov. 13, 2009; 33 pages.
USPTO; Final Office Action issued in U.S. Appl. No. 11/382,037; mailed Sep. 29, 2009; 7 pages.
USPTO; Advisory Action issued in U.S. Appl. No. 11/382,043; mailed Dec. 11, 2009; 4 pages.
European Patent Office; "Extended European Search Report (including the Supplementary European Search Report and the European Search Opinion)" issued in European Application No. EP 07 76 1296 for PCT/US2007/067437; dated Nov. 30, 2009; 8 pages.
USPTO; Final Office Action issued in U.S. Appl. No. 11/536,559; mailed Oct. 13, 2009; 8 pages.
USPTO; Final Office Action issued in U.S. Appl. No. 11/536,559; mailed Feb. 26, 2010; 9 pages.
USPTO; Notice of Allowance issued in U.S. Appl. No. 11/624,637 (Publication No. US 2008-0274804 A1) ; mailed Jan. 29, 2010; 6 pages.
USPTO; Final Office Action issued in U.S. Appl. No. 11/382,699; mailed Oct. 29, 2009; 11 pages.
USPTO; Office Action issued in U.S. Appl. No. 11/551,197; mailed Mar. 18, 2010; 9 pages.
USPTO; Office Action issued in U.S. Appl. No. 11/382,037; mailed Mar. 31, 2010; 8 pages.
USPTO; Notice of Allowance issued in U.S. Appl. No. 11/382,258; mailed Mar. 30, 2010; 4 pages.
USPTO; Final Office Action issued in U.S. Appl. No. 11/382,034; mailed Jun. 16, 2010; 34 pages.
USPTO; Office Action issued in U.S. Appl. No. 11/382,043; mailed Jun. 23, 2010; 16 pages.
USPTO; Office Action issued in U.S. Appl. No. 11/382,251; mailed Jun. 21, 2010; 10 pages.
USPTO; Advisory Action issued in U.S. Appl. No. 11/536,559; mailed Jun. 16, 2010; 3 pages.
USPTO; Notice of Allowance issued in U.S. Appl. No. 11/536,559; mailed Aug. 25, 2010; 4 pages.
USPTO; Interview Summary issued in U.S. Appl. No. 11/624,637; mailed May 5, 2009; 2 pages.
USPTO; Final Office Action issued in U.S. Appl. No. 11/551,197; mailed Sep. 1, 2010; 10 pages.
USPTO; Interview Summary issued in U.S. Appl. No. 11/382,699; mailed Mar. 29, 2010; 3 pages.
USPTO; Interview Summary issued in U.S. Appl. No. 11/382,699; mailed Apr. 26, 2010; 3 pages.
USPTO; Notice on Panel Decision issued in U.S. Appl. No. 11/382,699; mailed May 26, 2010; 2 pages.
USPTO; Office Action issued in U.S. Appl. No. 11/382,699; mailed Aug. 17, 2010; 12 pages.
USPTO; Advisory Action issued in U.S. Appl. No. 11/382,034; mailed Sep. 21, 2010; 4 pages.
USPTO; Final Office Action issued in U.S. Appl. No. 11/382,043; mailed Oct. 22, 2010; 17 pages.
USPTO; Office Action issued in U.S. Appl. No. 11/551,197; mailed Sep. 1, 2010; 10 pages.
USPTO; Office Action issued in U.S. Appl. No. 11/840,170; mailed Oct. 7, 2010; 11 pages.
USPTO; Notice of Allowance issued in U.S. Appl. No. 11/382,037; mailed Sep. 20, 2010; 11 pages.
Gvili, et al., "Depth Keying", SPIE vol. 5006 (2003),2003 SPIE-IS&T, pp. 564-574 (031).
Hemmi, et al., "3-D Natural Interactive Interface-Using Marker Tracking from a Single View", Sep. 9, 1991, Systems and Computers in Japan.
Ephraim et al. "Speech Enhancement Using a Minimum Mean—Square Error Log-Spectral Amplitude Estimator", 1985, IEEE.
Ephraim et al. "Speech Enhancement Using a Minimum Mean—Square Error Short-Time Spectral Amplitude Estimator", 1984, IEEE.
Richardson et al. "Virtual Network Computing", 1998, IEEE Internet Computing vol. 2.
Wilson et al., "Audio-Video Array Source Localization for Intelligent Environments", 2002 IEEE Dept. of Electrical Eng and Computer Science, MIT, Cambridge, MA 02139.
Fiala, et al., "A Panoramic Video and Acoustic Beamforming Sensor for Videoconferencing", 2004 IEEE, Computational Video Group, National Research Council, Ottawa, Canada K1A OR6.
Kanade, et al., "A Stereo Machine for Video-rate Dense Depth Mapping and Its New Application" 1996, CVPR 96, IEEE Computer Society Conference, pp. 196-202 (022).
Nakamura, et al., "A Consideration on Reconstructing 3-D Model Using Object Views", 2004-01601-003, pp. 17-21, Kokkaido University, Japan, nakamura@media.eng.hokudal.ac.jp.
Nakagawa, et al., "A Collision Detection and Motion Image Synthesis Between a Background Image and a Foreground 3-Dimensional Object", TVRSJ Bol. 4, No. 2, pp. 425-430, 1999, Japan.
Nishida, et al., "A Method of Estimating Human Shapes by Fitting the Standard Human Model to Partial Measured Data", D-11 vol. J84-D-11, No. 7, pp. 1310-1318, Jul. 2001.
Mihara, et al., "A Realtime Vision-Based Interface Using Motion Processor and Applications to Robotics", vol. J84-D-11, No. 9, pp. 2070-2078, Sep. 1, 2001, Japan.
Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.
Jojic, et al., "Tracking Self-Occluding Articulated Objects in Dense Disparity Maps", Computer Vision, 1999, The Proceedings for the Seventh IEEE International Conference on Kerkyra, Greece Sep. 20-27, 1999, Los Alamitos, CA, US, IEEE Computer Society, US, Sep. 20, 1999, pp. 123-130.
Fujitsu, "Internet Development of Emulators" Abstract, Mar. 1997, vol. 48, No. 2.
Lanier, Jaron, "Virtually there: three-dimensional tele-immersion may eventually bring the world to your desk", Scientific American, ISSN: 0036-8733, Year: 2001.
"The Tracking Cube: A Three-Dimensional Input Device", IBM Technical Disclosure Bulletin, Aug. 1, 1989, pp. 91-95, No. 3B, IBM Corp. New York, U.S.

(56) References Cited

OTHER PUBLICATIONS

K. B. Shimoga, et al., "Touch and Force Reflection for Telepresence Surgery". Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (and Elsewhere . . . )", Proceedings of the SPIE, SPIE, Bellingham, VA, US, vol. 4298, Jan. 24, 2001, pp. 48-55, XP008005351.

XP-002453974, "CFS and FS95/98/2000: How to Use the Trim Controls to Keep Your Aircraft Level", Aug. 10, 2007, http://support.microsoft.coml?scid=kb%3Ben-us%3B175195&x=13&y=15.

European Patent Office; App. No. 07251651.1; European Search Report mailed Oct. 18, 2007.

PCT; App. No. PCT/US06/61056; International Search Report and Written Opinion mailed Mar. 3, 2008.

PCT; App. No. PCT/US07/67004; International Search Report and Written Opinion of the International Searching Authority mailed Jul. 28, 2008.

USPTO; U.S. Appl. No. 11/382,031; Office Action mailed Sep. 30, 2008.

USPTO; U.S. Appl. No. 11/382,035; Office Action mailed Jul. 25, 2008.

USPTO; U.S. Appl. No. 11/382,031; Office Action mailed Sep. 2, 2009.

USPTO; U.S. Appl. No. 11/382,031; Final Office Action mailed Mar. 19, 2009.

USPTO; U.S. Appl. No. 11/382,035; Office Action mailed May 27, 2009.

USPTO; U.S. Appl. No. 11/382,035; Final Office Action mailed Jan. 7, 2009.

USPTO; U.S. Appl. No. 11/382,250; Final Office Action mailed May 1, 2009.

USPTO; U.S. Appl. No. 11/382,250; Office Action mailed Jan. 22, 2010.

USPTO; U.S. Appl. No. 11/382,250; Notice of Allowance mailed Sep. 13, 2010.

USPTO; U.S. Appl. No. 11/382,031; Notice of Allowance mailed Sep. 22, 2010.

Korean Patent Office; Korean App. No. 10-2008-7029704; Notice of Preliminary Rejection mailed Aug. 25, 2010.

Chinese Patent Office; China App. No. 200780016094; First Office Action mailed Aug. 16, 2010.

Korean Patent Office; Korean App. No. 10-2008-7029705; Notice of Preliminary Rejection mailed Aug. 25, 2010.

USPTO; U.S. Appl. No. 11/382,032; Office Action mailed Sep. 25, 2009.

European Patent Office; App. No. EP 07760946.9; Extended European Search Report mailed Oct. 27, 2010.

Definition of "mount" —Merriam-Webster Online Dictionary; downloaded from the Internet <http://www.M-w.com/dictionary/mountable>, downloaded on Nov. 8, 2007.

CFS and FS95/98/2000: How to Use the Trim Controls to Keep Your Aircraft Level; downloaded from the Internet <http://support,microsoft.com/?scid=kb%3Ben-us%3B175195&x=13&y=15>; downloaded on Aug. 10, 2007.

USPTO; Office Action issued in U.S. Appl. No. 11/382,034; mailed Dec. 23, 2010; 40 pages.

USPTO; Office Action issued in U.S. Appl. No. 11/382,034; mailed Jun. 28, 2011; 43 pages.

USPTO; Supplemental Notice of Allowability issued in U.S. Appl. No. 11/382,037; mailed Nov. 16, 2010; 5 pages.

USPTO; Notice of Allowance issued in U.S. Appl. No. 11/382,037; mailed Feb. 3, 2011; 6 pages.

USPTO; Office Action issued in U.S. Appl. No. 11/382,037; mailed May 26, 2011; 6 pages.

USPTO; Advisory Action issued in U.S. Appl. No. 11/382,043; mailed Jan. 26, 2011; 3 pages.

USPTO; Final Office Action issued in U.S. Appl. No. 11/382,043; mailed Apr. 13, 2011; 18 pages.

USPTO; Supplemental Final Office Action issued in U.S. Appl. No. 11/382,043; mailed Apr. 21, 2011; 18 pages.

EPO; Extended Search Report issued in European Application No. 07797288.3; dated Feb. 21, 2011; 8 pages.

USPTO; Office Action issued in U.S. Appl. No. 11/382,251; mailed Dec. 8, 2010; 12 pages.

USPTO; Notice of Allowance issued in U.S. Appl. No. 11/536,559; mailed Jan. 31, 2011; 4 pages.

USPTO; Notice of Allowance issued in U.S. Appl. No. 11/536,559; mailed May 12, 2011; 5 pages.

USPTO; Final Office Action issued in U.S. Appl. No. 11/840,170; mailed Mar. 22, 2011; 11 pages.

USPTO; Office Action issued in U.S. Appl. No. 11/840,170; mailed Jun. 23, 2011; 7 pages.

Korean Intellectualy Property Office; Notice of Preliminary Rejection in Korean Patent Application No. 10-2009-706674, which corresponds to U.S. Appl. No. 11/840,170; mailed Oct. 19, 2010; 8 pages.

State Intellectual Property Office, P.R. China; First Office Action in Chinese Patent Application No. 200880000845.3, which corresponds to U.S. Appl. No. 11/840,170; mailed Dec. 21, 2010; 8 pages.

USPTO; Final Office Action issued in U.S. Appl. No. 11/382,699; mailed Feb. 1, 2011; 12 pages.

USPTO; Interview Summary issued in U.S. Appl. No. 11/382,699; mailed Apr. 13, 2011; 3 pages.

Bolt, R.A., "'Put-that-there': voice and gesture at the graphics interface", Computer Graphics, vol. 14, No. 3 (ACM SIGGRAPH Conference Proceedings) Jul. 1980, pp. 262-270.

Dewitt, Thomas and Edelstein, Phil, "Pantomation: A System for Position Tracking," Proceedings of the 2nd Symposium on Small Computers in the Arts, Oct. 1982, pp. 61-69.

European Patent Office; "Extended European Search Report" issued in European Patent Application No. 12156402.5, dated Jul. 27, 2012, 11 pages.

European Patent Office; "Extended European Search Report" issued in European Patent Application No. 12156589.9, dated Aug. 2, 2012, 6 pages.

USPTO; Final Office Action issued in U.S. Appl. No. 12/262,044, mailed Nov. 8, 2012, 10 pages.

USPTO, Final Office Action issued in U.S. Appl. No. 11/382,251 mailed May 25, 2011, 12 pages.

USPTO, Notice of Allowance issued in U.S. Appl. No. 11/536,559 mailed Aug. 3, 2011, 5 pages.

USPTO, Notice of Allowance issued in U.S. Appl. No. 11/840,170 mailed Sep. 20, 2011, 8 pages.

USPTO, Office Action issued in U.S. Appl. No. 11/838,823 mailed Sep. 15, 2011, 7 pages.

USPTO, Office Action issued in U.S. Appl. No. 11/382,699 mailed Nov. 9, 2011, 11 pages.

USPTO, Office Action issued in U.S. Appl. No. 12/262,044 mailed Oct. 14, 2011, 10 pages.

USPTO, Office Action issued in U.S. Appl. No. 11/382,251 mailed Nov. 23, 2011, 11 pages.

Japanese Patent Office, Notification of Reasons for Refusal issued in Japanese Patent Application 2009-509960 dated Nov. 15, 2011, 8 pages.

USPTO, Notice of Allowance issued in U.S. Appl. No. 11/536,559 mailed Nov. 7, 2011, 5 pages.

USPTO, Final Office Action issued in U.S. Appl. No. 11/382,034 mailed Dec. 23, 2011, 47 pages.

USPTO, Office Action issued in U.S. Appl. No. 11/382,037 mailed Dec. 27, 2011, 5 pages.

USPTO, Notice of Allowance issued in U.S. Appl. No. 11/840,170 mailed Jan. 12, 2012, 8 pages.

Japanese Patent Office, Notification of Reasons for Refusal issued in Japanese Patent Application 2009-509977 dated Jan. 17, 2012, 10 pages.

USPTO, Final Office Action issued in U.S. Appl. No. 12/262,044 mailed Feb. 21, 2012, 9 pages.

USPTO, Notice of Allowance issued in U.S. Appl. No. 11/536,559 mailed Mar. 5, 2012, 5 pages.

USPTO, Final Office Action issued in U.S. Appl. No. 11/838,823 mailed Mar. 28, 2012, 8 pages.

You, S., "Fusion of Vision and Gyro Tracking for Robust Augmented Reality Registration", Proceedings IEEE Virtual Reality, 2001, 8 pages.

(56) References Cited

OTHER PUBLICATIONS

Dietrich, F., "Real Time Animation Techniques with Microcomputers", Pixel Creations, University of Michigan Press 1982, 4 pages.
USPTO, Final Office Action issued in U.S. Appl. No. 11/382,036 mailed Sep. 7, 2011, 26 pages.
USPTO; Advisory Action issued in U.S. Appl. No. 12/262,044 mailed Apr. 26, 2012, 2 pages.
USPTO; Notice of Allowance issued in U.S. Appl. No. 11/840,170 mailed May 1, 2012, 8 pages.
USPTO; Office Action issued in U.S. Appl. No. 11/382,699, mailed Jun. 5, 2012, 12 pages.
USPTO; Final Office Action issued in U.S. Appl. No. 11/382,034, mailed Feb. 5, 2013, 44 pages.
USPTO; Final Office Action issued in U.S. Appl. No. 13/004,780, mailed May 10, 2013, 11 pages.
USPTO; Final Office Action issued in U.S. Appl. No. 11/382,699, mailed Jul. 25, 2013, 14 pages.
USPTO; Advisory Action issued in U.S. Appl. No. 13/004,780, mailed Aug. 6, 2013, 3 pages.
Japanese Patent Office; "Decision to Grant a Patent" issued in Japanese Patent Application No. 2009-509960, dated Jun. 11, 2013, 3 pages.
USPTO; Notice of Allowance issued in U.S. Appl. No. 12/262,044, mailed Jun. 21, 2013, 10 pages.
USPTO; Final Office Action issued in U.S. Appl. No. 11/382,699, mailed Dec. 27, 2012, 13 pages.
USPTO; Advisory Action issued in U.S. Appl. No. 12/262,044, mailed Feb. 19, 2013, 3 pages.
USPTO; Office Action issued in U.S. Appl. No. 11/382,699, mailed Apr. 17, 2013, 14 pages.
European Patent Office; "Communication pursuant to Rules 70(2) and 70a(2) EPC" issued in European Patent Application No. 08797908.4, dated Jul. 10, 2012, 1 page.
USPTO; Notice of Allowance issued in U.S. Appl. No. 11/536,559, mailed Jul. 30, 2012, 5 pages.
Japanese Patent Office; Notification of Reasons for Refusal issued in corresponding Japanese Patent Application No. 2009-509960, dated Jul. 31, 2012, 7 pages (includes English translation).
USPTO; Notice of Allowance issued in U.S. Appl. No. 11/382,037, mailed Aug. 7, 2012, 8 pages.
Japanese Patent Office; Final Notification of Reasons for Refusal issued in Japanese Patent Application No. 2009-509977, mailed Aug. 14, 2012, 4 pages (includes English translation).
European Patent Office; "Communication pursuant to Rules 70(2) and 70a(2) EPC and reference to Rule 39(1) EPC" issued in European Patent Application No. 12156402.5, dated Sep. 3, 2012, 2 pages.
European Patent Office; "Communication pursuant to Rules 70(2) and 70a(2) EPC and reference to Rule 39(1) EPC" issued in European Patent Application No. 12156589.9, dated Sep. 10, 2012, 2 pages.
USPTO; Office Action issued in U.S. Appl. No. 11/382,251, mailed Dec. 4, 2012, 12 pages.
USPTO; Office Action issued in U.S. Appl. No. 11/382,034, mailed Jun. 26, 2012, 44 pages.
USPTO; Office Action issued in U.S. Appl. No. 13/004,780, mailed Jun. 27, 2012, 12 pages.
Japanese Patent Office; Notification of Reasons for Refusal issued in Japanese Patent Application No. 2010-515294, dated Jun. 26, 2012, 8 pages (includes English translation).
USPTO; Office Action issued in U.S. Appl. No. 12/262,044, mailed Jul. 10, 2012, 8 pages.
European Patent Office; "Supplementary European Search Report" issued in European Patent Application No. 08797908.4, dated Jun. 22, 2012, 5 pages.
European Patent Office; "Communication pursuant to Article 94(3) EPC" issued in European Patent Application No. 12156402.5; dated May 27, 2013, 5 pages.
Japanese Patent Office; "Notification of Reasons for Refusal" issued in Japanese Patent Application No. 2012-057132, dated Dec. 3, 2013, 4 pages (includes English translation).
Japanese Patent Office; "Notification of Reasons for Refusal" issued in Japanese Patent Application No. 2012-057129, dated Dec. 3, 2013, 8 pages (includes English translation).
USPTO; Office Action issued in U.S. Appl. No. 13/004,780, mailed Dec. 16, 2013, 12 pages.
USPTO; Final Office Action issued in U.S. Appl. No. 11/382,251, mailed Jan. 14, 2014, 13 pages.
Japanese Patent Office; "Notification of Reasons for Refusal" issued in Japanese Patent Application No. 2012-120096, dated Jan. 7, 2014, 5 pages (includes English translation).
USPTO; Office Action issued in U.S. Appl. No. 11/382,699, mailed Mar. 18, 2014, 15 pages.
USPTO; Notice of Allowance issued in U.S. Appl. No. 11/840,170, mailed Mar. 13, 2014, 8 pages.
USPTO; Pending Unpublished U.S. Appl. No. by inventor Zalewski, Gary M. et al.; U.S. Appl. No. 14/059,326, filed Oct. 21, 2013, and as amended by Preliminary Amendment filed Nov. 1, 2013; entitled "Method and Apparatus for Tracking Three-Dimensional Movements of an Object Using a Depth Sensing Camera"; 93 pages, which includes the specification, claims, abstract, and drawings as-filed Oct. 21, 2013, and Preliminary Amendment filed Nov. 1, 2013.
USPTO; Advisory Action issued in U.S. Appl. No. 11/382,251, mailed Apr. 4, 2014, 3 pages.
USPTO; Final Office Action issued in U.S. Appl. No. 13/004,780, mailed Jul. 1, 2014, 12 pages.
Japanese Patent Office; "Final Notification of Reasons for Refusal" issued in Japanese Patent Application No. 2012-057129, dated Mar. 17, 2015, 7 pages (includes English translation).
Japanese Patent Office; "Decision to Grant a Patent" issued in Japanese Patent Application No. 2012-057132, dated Mar. 17, 2015, 3 pages.
Japanese Patent Office; "Decision to Grant a Patent" issued in Japanese Patent Application No. 2012-120096, dated Mar. 17, 2015, 3 pages.
USPTO; Advisory Action issued in U.S. Appl. No. 13/004,780, mailed Sep. 19, 2014, 3 pages.
European Patent Office; "Communication pursuant to Article 94(3) EPC", issued in European Patent Application No. 08797908A, dated Dec. 1, 2015, 6 pages.
U.S. Appl. No. 29/246,743, Goto et al., Jun. 17, 2008, filed May 8, 2006.
U.S. Appl. No. 29/246,744, Goto et al., Jan. 4, 2011, filed May 8, 2006.
U.S. Appl. No. 29/246,759, Zalewski et al., filed May 8, 2006.
U.S. Appl. No. 29/246,762, Zalewski et al., filed May 8, 2006.
U.S. Appl. No. 29/246,763, Zalewski et al., May 8, 2006.
U.S. Appl. No. 29/246,764, Zalewski et al., filed May 8, 2006.
U.S. Appl. No. 29/246,765, Zalewski et al., May 8, 2006.
U.S. Appl. No. 29/246,766, Zalewski et al., May 8, 2006.
U.S. Appl. No. 29/246,767, Goto et al., Jul. 1, 2008, filed May 8, 2006.
U.S. Appl. No. 29/246,768, Goto et al., Jun. 24, 2008, filed May 8, 2006.
USPTO, Office Action from U.S. Appl. No. 11/382,043; U.S. Pub. No. US-2006-0264260-A1; mailed Feb. 5, 2008; 16 pages.
USPTO, Office Action from U.S. Appl. No. 11/382,699; U.S. Pub. No. US-2007-0265075-A1; mailed Feb. 14, 2008; 15 pages.
USPTO, Office Action from U.S. Appl. No. 11/536,559; mailed Dec. 10, 2007; 6 pages.
NaturalPoint Inc., "NaturalPoint TrackIR, TrackIR Software Version 3.10 Manual", Old TrackIR Manual 3.10, posted on the Internet May 3, 2004, pp. 1-35.
NaturalPoint Inc., "NaturalPoint TrackIR, Users Manual version 4.0. 020", TrackIR 3 :: TrackIR Manual 4.0.020, posted on the Internet Jan. 9, 2005, pp. 1-29.
USPTO; Office Action issued in U.S Appl. No. 14/059,326, mailed Feb. 10, 2016, 18 pages.
USPTO; Notice of Allowance issued in U.S. Appl. No. 13/004,780, mailed Mar. 8, 2016, 7 pages.
US 2002/0018582 A1, 02/2002, Hagiwara et al. (withdrawn)

* cited by examiner

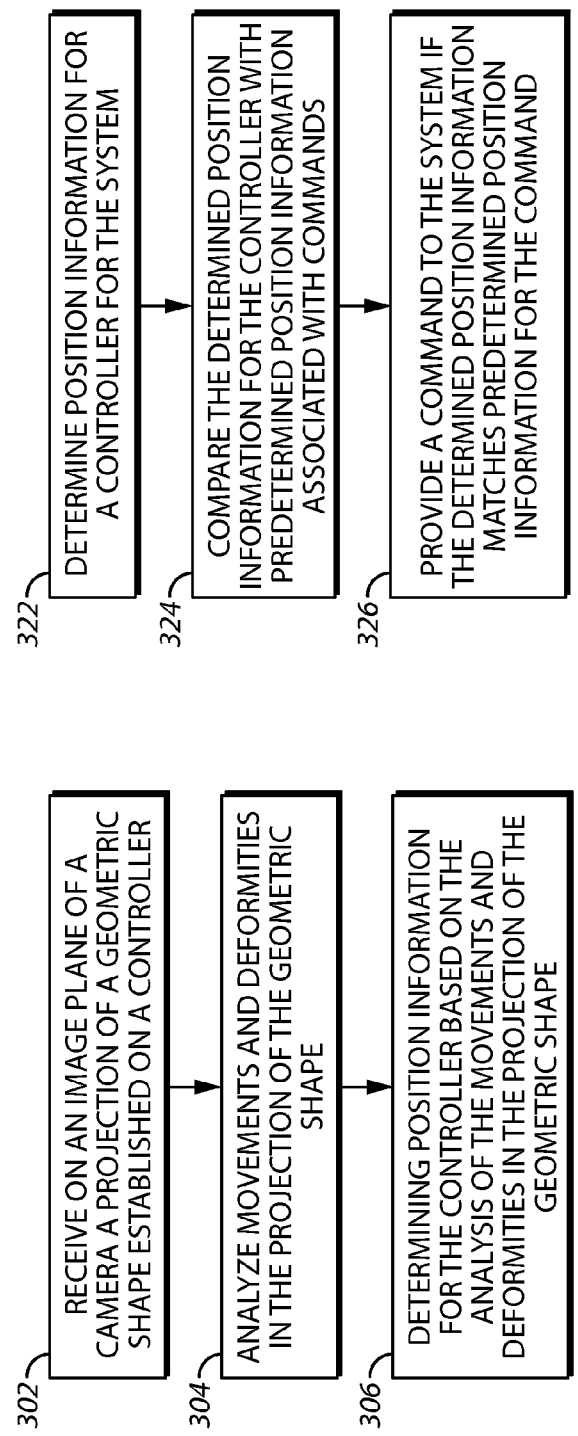

METHOD FOR MAPPING MOVEMENTS OF A HAND-HELD CONTROLLER TO GAME COMMANDS

CROSS-REFERENCE TO RELATED APPLICATIONS

This application is a continuation in part (CIP) of U.S. patent application Ser. No. 10/207,677, entitled, "MAN-MACHINE INTERFACE USING A DEFORMABLE DEVICE", filed on Jul. 27, 2002; U.S. patent application Ser. No. 10/650,409, entitled, "AUDIO INPUT SYSTEM", filed on Aug. 27, 2003; U.S. patent application Ser. No. 10/663,236, entitled "METHOD AND APPARATUS FOR ADJUSTING A VIEW OF A SCENE BEING DISPLAYED ACCORDING TO TRACKED HEAD MOTION", filed on Sep. 15, 2003; U.S. patent application Ser. No. 10/759,782, entitled "METHOD AND APPARATUS FOR LIGHT INPUT DEVICE", filed on Jan. 16, 2004; U.S. patent application Ser. No. 10/820,469, entitled "METHOD AND APPARATUS TO DETECT AND REMOVE AUDIO DISTURBANCES", filed on Apr. 7, 2004; and U.S. patent application Ser. No. 11/301,673, entitled "METHOD FOR USING RELATIVE HEAD AND HAND POSITIONS TO ENABLE A POINTING INTERFACE VIA CAMERA TRACKING", filed on Dec. 12, 2005; U.S. patent application Ser. No. 11/381,729, to Xiao Dong Mao, entitled ULTRA SMALL MICROPHONE ARRAY, filed on May 4, 2006, application Ser. No. 11/381,728, to Xiao Dong Mao, entitled ECHO AND NOISE CANCELLATION, filed on May 4, 2006, U.S. patent application Ser. No. 11/381,725, to Xiao Dong Mao, entitled "METHODS AND APPARATUS FOR TARGETED SOUND DETECTION", filed on May 4, 2006, U.S. patent application Ser. No. 11/381,727, to Xiao Dong Mao, entitled "NOISE REMOVAL FOR ELECTRONIC DEVICE WITH FAR FIELD MICROPHONE ON CONSOLE", filed on May 4, 2006, U.S. patent application Ser. No. 11/381,724, to Xiao Dong Mao, entitled "METHODS AND APPARATUS FOR TARGETED SOUND DETECTION AND CHARACTERIZATION", filed on May 4, 2006, U.S. patent application Ser. No. 11/381,721, to Xiao Dong Mao, entitled "SELECTIVE SOUND SOURCE LISTENING IN CONJUNCTION WITH COMPUTER INTERACTIVE PROCESSING", filed on May 4, 2006, all of which are hereby incorporated by reference.

This application claims benefit of U.S. Provisional Patent Application No. 60/718,145, entitled "AUDIO, VIDEO, SIMULATION, AND USER INTERFACE PARADIGMS", filed Sep. 15, 2005, which is hereby incorporated by reference.

RELATED APPLICATIONS

This application is also related to co-pending application Ser. No. 11/418,988, to Xiao Dong Mao, entitled "METHODS AND APPARATUSES FOR ADJUSTING A LISTENING AREA FOR CAPTURING SOUNDS", filed on May 4, 2006, the entire disclosures of which are incorporated herein by reference. This application is also related to co-pending application Ser. No. 11/418,989, to Xiao Dong Mao, entitled "METHODS AND APPARATUSES FOR CAPTURING AN AUDIO SIGNAL BASED ON VISUAL IMAGE", filed on May 4, 2006, the entire disclosures of which are incorporated herein by reference. This application is also related to co-pending application Ser. No. 11/429,047, to Xiao Dong Mao, entitled "METHODS AND APPARATUSES FOR CAPTURING AN AUDIO SIGNAL BASED ON A LOCATION OF THE SIGNAL", filed on May 4, 2006, the entire disclosures of which are incorporated herein by reference. This application is also related to co-pending application Ser. No. 11/429,133, to Richard Marks et al., entitled "SELECTIVE SOUND SOURCE LISTENING IN CONJUNCTION WITH COMPUTER INTERACTIVE PROCESSING", filed on May 4, 2006, the entire disclosures of which are incorporated herein by reference. This application is also related to co-pending application Ser. No. 11/429,414, to Richard Marks et al., entitled "Computer Image and Audio Processing of Intensity and Input Devices for Interfacing With A Computer Program", filed on May 4, 2006, the entire disclosures of which are incorporated herein by reference.

This application is also related to co-pending application Ser. No. 11/382,031, entitled "MULTI-INPUT GAME CONTROL MIXER", filed on May 6, 2006, the entire disclosures of which are incorporated herein by reference.

This application is also related to co-pending application Ser. No. 11/382,032, entitled "SYSTEM FOR TRACKING USER MANIPULATIONS WITHIN AN ENVIRONMENT", filed on May 6, 2006, the entire disclosures of which are incorporated herein by reference.

This application is also related to co-pending application Ser. No. 11/382,033, entitled "SYSTEM, METHOD, AND APPARATUS FOR THREE-DIMENSIONAL INPUT CONTROL", filed on May 6, 2006, the entire disclosures of which are incorporated herein by reference.

This application is also related to co-pending application Ser. No. 11/382,035, entitled "INERTIALLY TRACKABLE HAND-HELD CONTROLLER", filed on May 6, 2006, the entire disclosures of which are incorporated herein by reference.

This application is also related to co-pending application Ser. No. 11/382,036, entitled "METHOD AND SYSTEM FOR APPLYING GEARING EFFECTS TO VISUAL TRACKING", filed on May 6, 2006, the entire disclosures of which are incorporated herein by reference.

This application is also related to co-pending application Ser. No. 11/382,041, entitled "METHOD AND SYSTEM FOR APPLYING GEARING EFFECTS TO INERTIAL TRACKING", filed on May 6, 2006, the entire disclosures of which are incorporated herein by reference.

This application is also related to co-pending application Ser. No. 11/382,038, entitled "METHOD AND SYSTEM FOR APPLYING GEARING EFFECTS TO ACOUSTICAL TRACKING", filed on May 6, 2006, the entire disclosures of which are incorporated herein by reference.

This application is also related to co-pending application Ser. No. 11/382,040, entitled "METHOD AND SYSTEM FOR APPLYING GEARING EFFECTS TO MULTI-CHANNEL MIXED INPUT", filed on May 6, 2006, the entire disclosures of which are incorporated herein by reference.

This application is also related to co-pending application Ser. No. 11/382,034, entitled "SCHEME FOR DETECTING AND TRACKING USER MANIPULATION OF A GAME CONTROLLER BODY", filed on May 6, 2006, the entire disclosures of which are incorporated herein by reference.

This application is also related to co-pending application Ser. No. 11/382,037, entitled "SCHEME FOR TRANSLATING MOVEMENTS OF A HAND-HELD CONTROLLER INTO INPUTS FOR A SYSTEM", filed on May 6, 2006, the entire disclosures of which are incorporated herein by reference.

This application is also related to co-pending application Ser. No. 11/382,043, entitled "DETECTABLE AND TRACKABLE HAND-HELD CONTROLLER", filed on the same day as this application, the entire disclosures of which are incorporated herein by reference.

This application is also related to co-pending application Ser. No. 29/259,349, entitled "CONTROLLER WITH INFRARED PORT", filed on May 6, 2006, the entire disclosures of which are incorporated herein by reference.

This application is also related to co-pending application Ser. No. 29/259,350, entitled "CONTROLLER WITH TRACKING SENSORS", filed on May 6, 2006, the entire disclosures of which are incorporated herein by reference.

This application is also related to application Ser. No. 60/798,031, entitled "DYNAMIC TARGET INTERFACE", filed on May 6, 2006, the entire disclosures of which are incorporated herein by reference.

This application is also related to co-pending application Ser. No. 29/259,348, entitled "TRACKED CONTROLLER DEVICE", filed on May 6, 2006, the entire disclosures of which are incorporated herein by reference.

BACKGROUND OF THE INVENTION

1. Field of the Invention

The present invention relates generally to computer entertainment systems, and more specifically to a user's manipulation of a controller for such computer entertainment systems.

2. Discussion of the Related Art

Computer entertainment systems typically include a hand-held controller, game controller, or other controller. A user or player uses the controller to send commands or other instructions to the entertainment system to control a video game or other simulation being played. For example, the controller may be provided with a manipulator which is operated by the user, such as a joy stick. The manipulated variable of the joy stick is converted from an analog value into a digital value, which is sent to the game machine main frame. The controller may also be provided with buttons that can be operated by the user.

It is with respect to these and other background information factors that the present invention has evolved.

SUMMARY OF THE INVENTION

One embodiment provides a method for use in a game, comprising the steps of: receiving position information for a controller that is being manipulated by a user; analyzing the position information to determine whether a predetermined movement of the controller associated with a command has been performed; and executing the command if the predetermined movement of the controller associated with the command has been performed.

Another embodiment provides a computer program product comprising a medium for embodying a computer program for input to a computer and a computer program embodied in the medium for causing the computer to perform steps of: receiving position information for a controller that is being manipulated by a user; analyzing the position information to determine whether a predetermined movement of the controller associated with a command has been performed; and executing the command if the predetermined movement of the controller associated with the command has been performed.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein:

FIG. 3A is a flow diagram illustrating a method for use in obtaining information in accordance with an embodiment of the present invention;

FIG. 3B is a flow diagram illustrating a method for use in providing input to a system in accordance with an embodiment of the present invention;

DETAILED DESCRIPTION

The user or player of a video game typically holds the game controller with one or both hands in order to operate the buttons, joy stick, etc., located on the controller. Often times while playing the game the user will also move the entire controller itself around in the air as he or she simultaneously operates the buttons, joy stick, etc. Some users tend to get excited while playing the game and attempt to control actions or aspects of the game by moving the entire controller itself around in the air.

Various embodiments of the methods, apparatus, schemes and systems described herein provide for the detection, capture and tracking of the movements, motions and/or manipulations of the entire controller body itself by the user. The detected movements, motions and/or manipulations of the entire controller body by the user may be used as additional commands to control various aspects of the game or other simulation being played.

Detecting and tracking a user's manipulations of a game controller body may be implemented in different ways. For example, in some embodiments a camera peripheral can be used with the computer entertainment system to detect motions of the hand-held controller body and transfer them into actions in a game. The camera can be used to detect many different types of motions of the controller, such as for example up and down movements, twisting movements, side to side movements, jerking movements, wand-like motions, plunging motions, etc. Such motions may correspond to various commands such that the motions are transferred into actions in a game.

Detecting and tracking the user's manipulations of a game controller body can be used to implement many different types of games, simulations, etc., that allow the user to, for example, engage in a sword or lightsaber fight, use a wand to trace the shape of items, engage in many different types of sporting events, engage in on-screen fights or other encounters, etc.

Figure 1A:
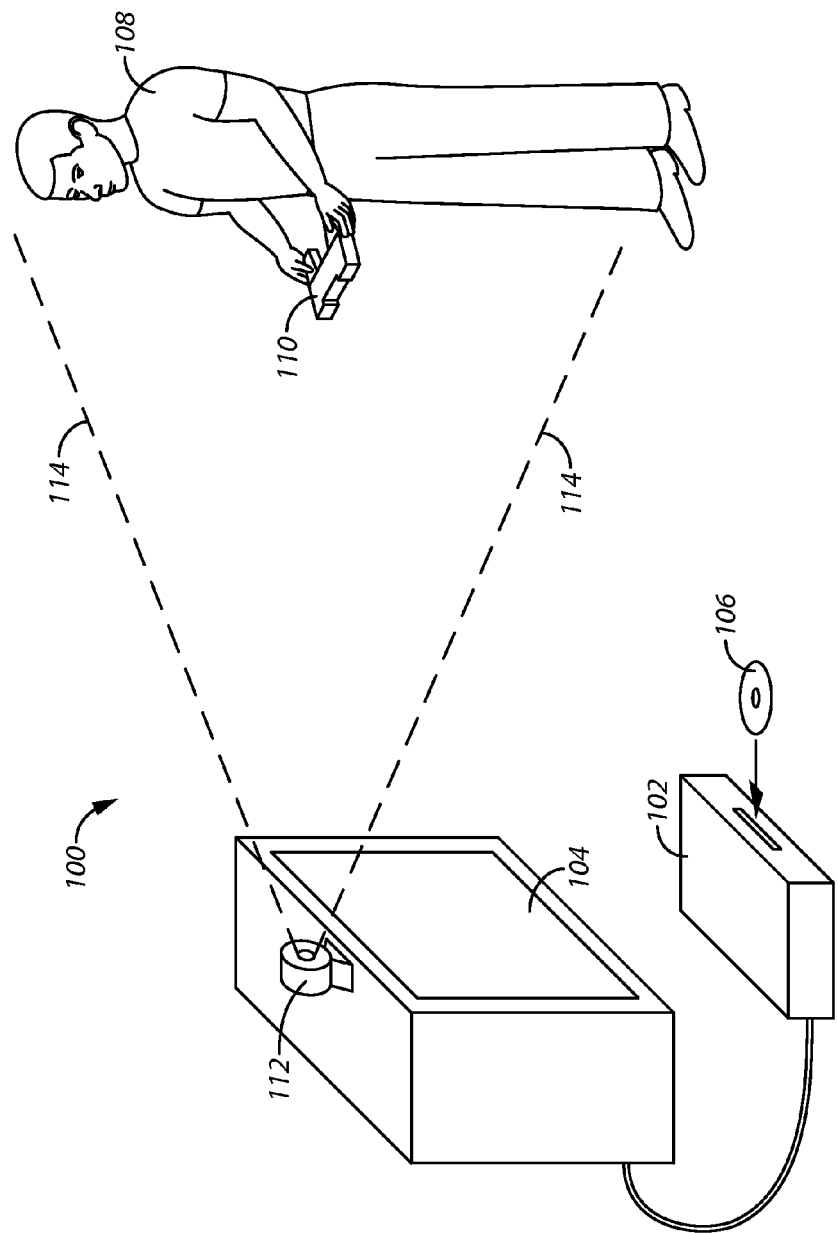
FIG. 1A is a pictorial diagram illustrating a system that operates in accordance with an embodiment of the present invention.

Referring to FIG. 1A, there is illustrated a system 100 that operates in accordance with an embodiment of the present invention. As illustrated, a computer entertainment system or console 102 uses a television or other video display 104 to display the images of the video game or other simulation thereon. The game or other simulation may be stored on a DVD, CD, flash memory, USB memory, or other memory media 106 that is inserted into the console 102. A user or player 108 manipulates a game controller 110 to control the video game or other simulation.

A camera or other video image capturing device 112 is positioned so that the controller 110 is within the camera's field of view 114. As illustrated, the camera 110 may be placed on the video display 104, but it should be well understood that the camera may be located elsewhere. By way of example, the camera 112 may comprise a camera peripheral device such as the commercially available EyeToy™ product. But it should be well understood that any type or brand of camera may be used, such as for example a web-cam camera, add-on USB camera, infrared (IR) capability camera, fast frame capture rate camera, etc.

During operation, the user 108 physically moves the controller 110 itself. That is, the user 108 physically moves the entire controller 110 around in the air. For example, the controller 110 may be moved in any direction by the user 108, such as up, down, to one side, to the other side, twisted, rolled, shaken, jerked, plunged, etc. These movements of the controller 110 itself may be detected and captured by the camera 112 by way of tracking through image analysis in a manner described below.

In general, the detected and captured movements of the controller 110 are used to generate position and orientation data for the controller 110. Because this data is gathered on an image frame-by-frame basis, the data can be used to calculate many physical aspects of the movement of the controller 110, such as for example its acceleration and velocity along any axis, its tilt, pitch, yaw, roll, as well as any telemetry points of the controller 110.

The ability to detect and track the movements of the controller 110 makes it possible to determine whether any predefined movements of the controller 110 are performed. That is, certain movement patterns or gestures of the controller 110 may be predefined and used as input commands for the game or other simulation. For example, a plunging downward gesture of the controller 110 may be defined as one command, a twisting gesture of the controller 110 may be defined as another command, a shaking gesture of the controller 110 may be defined as another command, and so on. In this way the manner in which the user 108 physically moves the controller 110 itself is used as another input for controlling the game, which provides a more stimulating and entertaining experience for the user. Examples of how movements of the controller 110 can be mapped to input commands for the game will be discussed below.

Figure 1B:
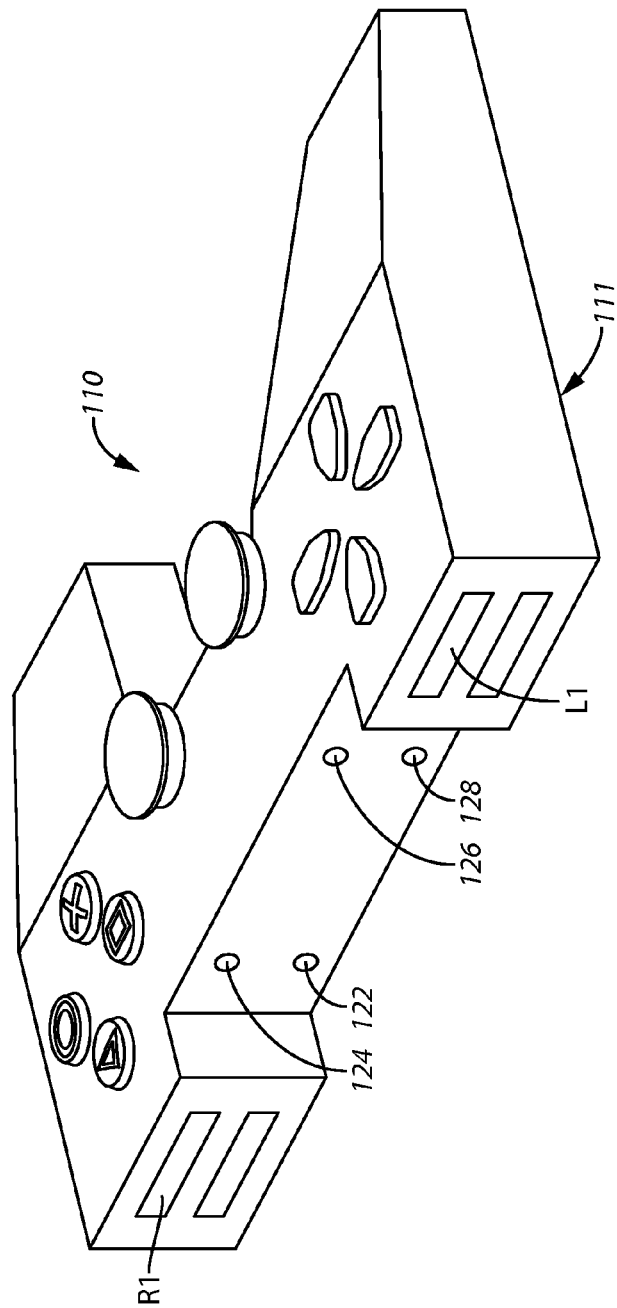
FIG. 1B is a perspective view of a controller made in accordance with an embodiment of the present invention.

Referring to FIG. 1B, there is illustrated a more detailed view of the controller 110 that is made in accordance with an embodiment of the present invention. The controller 110 includes a body 111. The body 111 is the part of the game controller 110 that one would hold by hand (or wear if it were a wearable game controller). An input device manipulable by a user is something such as, for example, a button or multi-axis control stick on the controller. One or more buttons may be disposed on the body 111. The body may include a housing holdable by hand. The housing may include a handgrip graspable by hand. Thus, during operation when the user 108 physically moves the controller 110 itself, the user 108 physically moves the body 111 of the controller 110. The user moves the body 111 around in the air, or in free-space.

The body 111 may have a forward section to be oriented towards a screen when a progress of a game controlled in accordance with the game controller is displayed upon the screen. At least one input device may be assembled with the body 111 with the input device manipulable by a user to register an input from the user.

One or more light-emitting diodes (LEDs) may be disposed on the body that are arranged in a geometric shape. Or, another type of photonically detectable ("PD") element may be assembled with the body 111. A position of the photonically detectable element may be within an image being recorded by an image capture device when the forward section is oriented at least generally towards the screen. The positions of the PD element at different points in time may be quantifiable at quantify movement of the body 111 in space.

In this embodiment, the controller 110 includes four light-emitting diodes (LEDs) 122, 124, 126, 128. As illustrated, the four LEDs 122, 124, 126, 128 may be arranged in a substantially square or rectangular pattern and located on the bridge of the controller 110 between the R1 and L1 buttons. Thus, in this embodiment the geometric shape comprises a substantially square or rectangular pattern. The square or rectangular pattern formed by the four LEDs 122, 124, 126, 128 will be referred to herein as the "bounding box" formed by the LEDs.

It should be well understood that the geometric shape may comprise many different shapes. For example, the geometric shape may comprise any linear or two-dimensional pattern. Although a linear array of LEDs is preferred, the LEDs may alternatively, be arranged in a rectangular pattern or an arcuate pattern to facilitate determination of an image plane of the LED array when analyzing an image of the LED pattern obtained by an image capture camera.

While the illustrated embodiment of the controller utilizes four LEDs, it should be well understood that other embodiments may utilize more than four LEDs or less than four LEDs. For example, three LEDs will work, and two LEDs will also work to provide tracking information. Even one LED can provide position information. Furthermore, the LEDs may be located on a different part of the controller 110.

The four LEDs 122, 124, 126, 128 produce four points or dots that are perceived by camera 112 (FIG. 1A). Because the camera 112 is looking at the player 108 with the controller 110 in his hands, the camera 112 is able to track the movement of the controller 110 by tracking the movement of the dots produced by the four LEDs 122, 124, 126, 128 and the bounding box that they form.

Namely, as the user 108 twists and rotates the controller body 110 the projection of the four dots are cast on the image plane of the camera 112's outputs. Image analysis is used to track the user's manipulations of the controller and to determine controller position and orientation. Thus, the four LEDs 122, 124, 126, 128 produce information regarding the body's movement. The positions of one or two controllers can be determined, or the relative movements of two controllers can be tracked.

Figure 2A:
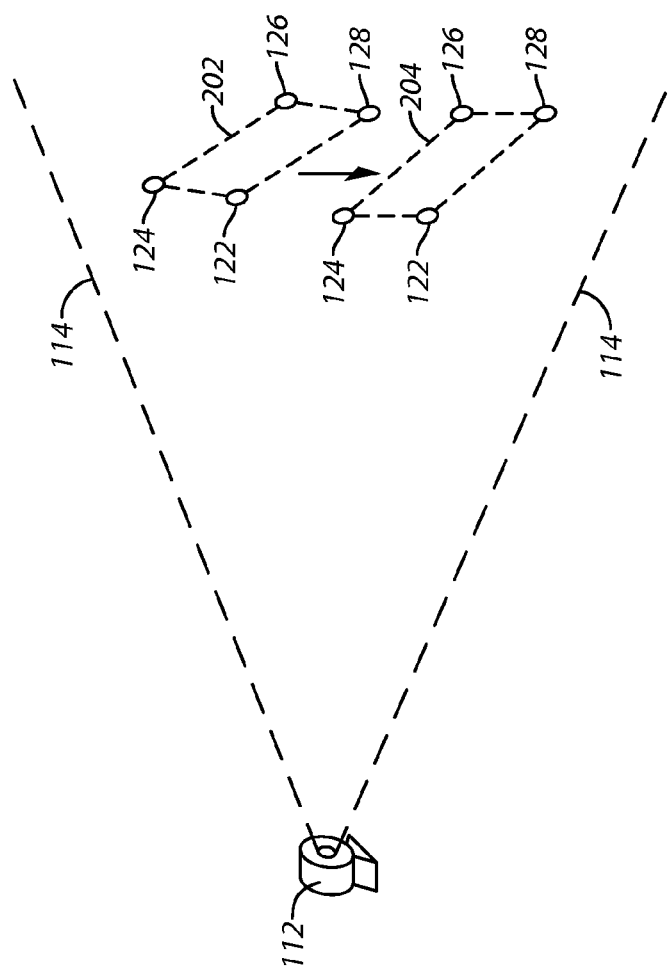
FIG. 2A is a pictorial diagram illustrating a manner for determining position information for a controller in accordance with an embodiment of the present invention.

FIG. 2A illustrates an example of how the bounding box is used to track the movements of the controller. Specifically, the controller, and thus the four LEDs 122, 124, 126, 128, are located within the field of view 114 of the camera 112. The four LEDs 122, 124, 126, 128 form a bounding box 202 when the controller is in a first position. When the controller is moved to a second position the four LEDs 122, 124, 126, 128 form a second bounding box 204. In addition, when the controller is moved from the first to the second position, the intermediate positions of the bounding boxes are also captured, depending on the speed of the movement and the frame rate of the camera 112.

Figure 2B:
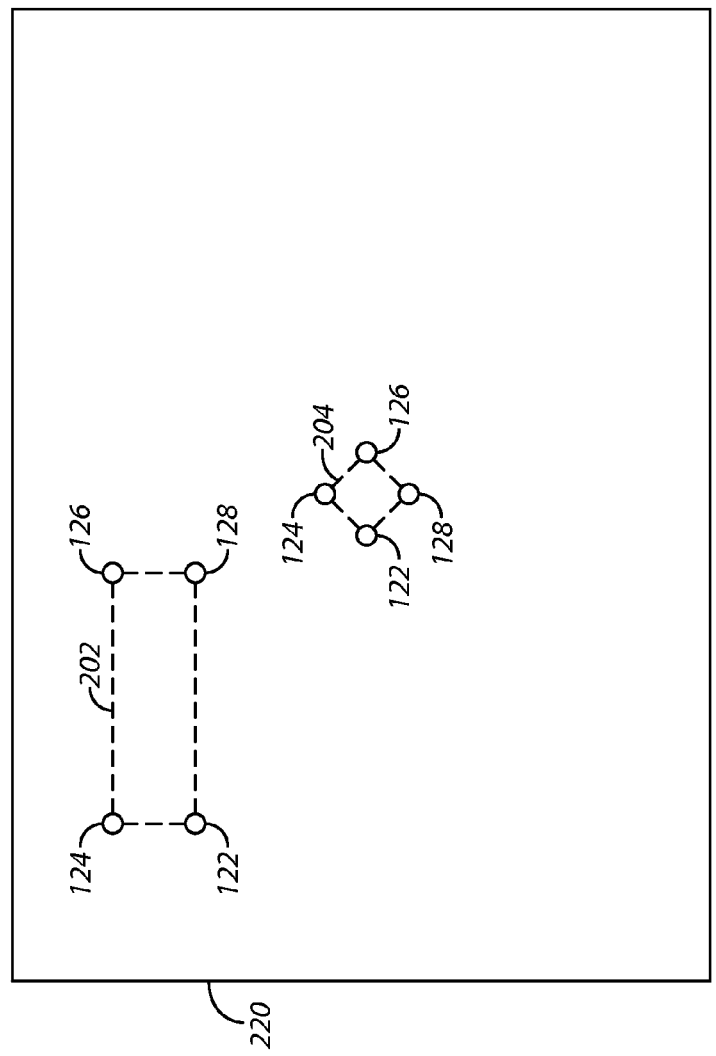
FIG. 2B is a planar view of an image plane illustrating a manner for determining position information for a controller in accordance with an embodiment of the present invention.

The bounding boxes 202 and 204 formed by the four LEDs 122, 124, 126, 128 are captured in the image plane of the camera 112. FIG. 2B illustrates an example of the image plane 220 of the camera 112 showing the bounding boxes 202 and 204. A physics analysis is performed to derive and determine the movements of the bounding box and how the rectangle of the bounding box deforms into different shapes based on the tilt, yaw, etc. of the controller. By projecting the bounding boxes on the image plane, the position, orientation, acceleration, velocity, etc., of the controller can be determined, which can in turn be used to track the user's manipulations of the game controller.

Referring to FIG. 3A, there is illustrated a method 300 for use in obtaining information from a controller in accordance with an embodiment of the present invention. The method 300 may be executed and performed by many different types of systems and devices, such as for example entertainment systems and consoles, computers, consumer electronics device, etc. An example of a system that may be used to perform the method 300 will be described below.

The method 300 begins in step 302 in which a projection of a geometric shape established on the controller is received on an image plane of a camera. This step may be performed as has already been described above.

In step 304 the movements and deformities in the projection of the geometric shape are analyzed. Namely, the four dots of the bounding box are tracked and analyzed. Field and frame analysis is performed on the image plane of the camera output to analyze the manipulation of the four reference points to determine position orientation, tilt, yaw, roll, etc. of the controller. In addition, acceleration of the controller can be tracked in any direction. Analysis of the frames of the image can give the acceleration along any axis. Telemetry points of the controller can also be computed. It can also be determined whether or not the controller is in a resting position or resting state, such as for example when the controller is in a neutral or steady state near the user's waist.

As the controller rolls the image translates in the plane. Changes in the width of the rectangle of the bounding box indicate the controller is rolling. As the yaw of the controller is adjusted, the width of the rectangle changes. Yaw maps to the width of the rectangle. Tilt of the controller influences the height of the rectangle.

For example, the bounding box 202 (FIG. 2B) indicates that the controller was initially positioned looking fairly straight ahead at the camera. The bounding box 204 indicates that the controller was then moved downward, rolled and turned to the user's left.

It is difficult to know which side of the "ground plane" the controller is positioned on because the image plane only sees a deformed rectangle. For example, this issue can occur if someone walks in front of and occludes the camera during a time when the user manipulates the controller and moves the controller to an equal distance on the other side of an axis horizon line. This may cause the bounding box to look the same in the image plane. This can also happen if the controller travels outside of the viewing region of the image capture device.

As such, a determination may need to be made as to whether the deformation is caused by positive or negative tilt or roll (positive and negative being related to up/down and left/right movements away from the steady state origin position). This can be solved by reading other telemetry from the controller or by strobing or modulating the LEDs to enable the video analyzer system to discriminate individual corners of the bounding box rectangle for tracking purposes. The LEDs may be strobed or modulated as an aid for discerning the different corners of the bounding box. Or, each LED may have its own frequency as an aid for discerning the different corners of the bounding box. By identifying each specific corner of a bounding region, i.e. each LED, it can be determined which side of a horizontal line the controller is on at any point in time. In this way problems associated with the controller passing through the camera plane can be handled.

Tracking the movements and rotations of the bounding box on the screen is based on a frame-by-frame analysis. The camera's output creates the frames of image data. The projection of the bounding box is captured in software. The movements of the controller across the frames is based on the translation of the box.

The use of a high frame rate provides the ability to accurately track acceleration and changes in acceleration of the movement of the controller. That is, by projecting the image on the plane at high rates, the delta movements of the controller can be tracked. This provides the ability to plot the acceleration, the points where the acceleration peaks out, the points where gravity zeros out, and the points of inflection. The points of inflection are the transition points where the controller stops and changes direction. All of this analysis is performed by analyzing the frames of the image and determining the position and deformation of the bounding box. By way of example, frame rates of 120 frames per second or higher may be used, but it should well understood that any frame rate may be used.

As will be discussed below, the history of previous frames may be mapped. This allows the previous telemetry of the controller to be looked at for determining certain parameters such as, for example, in tracking acceleration, velocity, and stopping points.

In step 306 (FIG. 3A) position information for the controller is determined based on the analysis of the movements and deformities in the projection of the geometric shape. By way of example, an image analyzer may be used to perform one or both of steps 304 and 306. Namely, an image analyzer may be used to perform the analysis of the movements and deformations of the bounding boxes in the image plane of the camera. The output of the video camera may be coupled to the input of an image analyzer. An example of a system which may incorporate an image analyzer for implementing one or more of the methods, schemes and functions described herein will be discussed below.

The image analyzer monitors the bounding box formed by the reference LEDs as captured in the image plane of the camera. The image analyzer analyzes the position, rotation, horizontal and vertical deformation of the bounding box to determine the physical user manipulation of the controller, its position, roll, tilt and yaw coordinates. At the end of the image analysis the data may be output in the form of an output ID or the like. Such output IDs from the image analysis may include data such as the x, y, z coordinates, acceleration and velocity along any axis, that the controller is in a resting position or state, etc. Thus, at the end of image analysis the image analyzer can indicate where the controller is and whether a command is issued. And the image analyzer may be pinged at any instant of time and it may provide position, orientation, last command, etc.

By way of example, the image analyzer may provide, but shall not be limited to providing the following outputs:

CONTROLLER POSITION (X, Y, Z coordinates);
CONTROLLER ORIENTATION alpha, beta, gamma (radians);
CONTROLLER X-AXIS VELOCITY;
CONTROLLER Y-AXIS VELOCITY;
CONTROLLER Z-AXIS VELOCITY;
CONTROLLER X-AXIS ACCELERATION;
CONTROLLER Y-AXIS ACCELERATION;
CONTROLLER Z-AXIS ACCELERATION;
RESTING POSITION OF STEADY STATE Y/N (at waist as described, but may be defined as any position);
TIME SINCE LAST STEADY STATE;
LAST GESTURE RECOGNIZED;
TIME LAST GESTURE RECOGNIZED; and
INTERRUPT ZERO-ACCELERATION POINT REACHED.

Each of these outputs may be generated by analyzing the movements and deformations of the bounding box as described above. These outputs may be further processed in order to track the movement of the controller. Such tracking will allow certain movements of the controller to be recognized, which can then be used to trigger certain commands as described below. It should be well understood that many other outputs may be used in addition to or in replacement of the above-listed outputs.

Additional inputs to the image analyzer may optionally be provided. Such optional inputs may include but shall not be limited the following:

SET NOISE LEVEL (X, Y or Z AXIS) (this is a reference tolerance when analyzing jitter of hands in the game);
SET SAMPLING RATE (how often frames of the camera are being taken in and analyzed);
SET GEARING; and
SET MAPPING CHAIN.

As mentioned above, the ability to detect and track the movements of the controller 110 makes it possible to determine whether any predefined movements of the controller 110 are performed. That is, certain movement patterns or gestures of the controller 110 may be mapped to input commands for the game or other simulation.

Referring to FIG. 3B, there is illustrated a method 320 for use in providing input to a system in accordance with an embodiment of the present invention. The method 320 begins in step 322 in which position information for a controller for the system is determined. This step may be performed using the methods and techniques described above.

In step 324, the determined position information for the controller is compared with predetermined position information associated with commands. That is, any number of different movements, gestures or manipulations of the controller may be mapped to various commands. This allows different movements, gestures or manipulations of the controller to be mapped into game models. For example, moving the controller up may be mapped to one command, moving the controller down may be mapped to another command, and moving the controller in any other direction may be mapped to other commands.

Similarly, shaking the controller once may be mapped to one command, shaking the controller twice may be mapped to another command, and similarly, shaking the controller three, four, five, etc., times may be mapped to other commands. That is, various gestures may be established based on shaking the controller a certain number of times. Still other gestures may be established based on shaking the controller up and down vigorously a certain number of times. Other movements of the controller such as twisting, rolling, etc., may be mapped to still other commands.

Thus, various different trajectories of the game controller may be mapped onto gestures, which trigger commands in the game. Each command is mapped to a predetermined movement of the controller. Such predetermined movements of the controller will have associated predetermined position information. In this embodiment the determined position information for the controller is compared with the predetermined position information to see if a command should be triggered.

By way of example, such mapping of gestures to game commands may be implemented as follows. The outputs of the image analyzer may be used to determine position and orientation information for the controller. The image analyzer may output various different IDs that are indicative of position and orientation of the controller. For example, one ID may be output for a steady state determination, another ID may be output to indicate shaking of the controller, and various other IDs may be output to indicate other orientations. Thus, the use of such IDs may be used to output whether the controller is in steady state or is moving. If the controller is in steady state, an ID may indicate how long the controller has been in steady state.

The determined position and orientation information for the controller may then be compared with predetermined position information associated with input commands for the game. If the determined position information matches the predetermined position information for a command, then the command is provided to the entertainment system. Again, various gestures such as pushing the controller up or down, twisting in a circle, right or left, twisting while pulling it up or down, rolling right or left, etc., may all be mapped to various commands.

When a new command or gesture is recognized the image analyzer may trigger an interrupt. The triggering of such an interrupt may be used as part of the process of providing the command to the entertainment system. The system may optionally be configured so that zero acceleration points in the axes, stop points, and/or other events also trigger interrupts.

In comparing the determined position and orientation information with the predetermined position information associated with input commands to see if there is a match, it may often be the case that there is not an exact match. This is because with movement of the controller in free-space it may be difficult to precisely recreate a predefined movement. Therefore, the predetermined position information associated with input commands may be defined in terms of ranges, tolerances, and/or thresholds that are considered to be close enough to the predetermined position information such as to activate the command. That is, commands may be defined in terms of the thresholds or ranges. Thus, in determining whether or not any commands or gestures have been identified, the system may check to see if the determined position and orientation information falls within a range of a gesture. Thus, the defined commands may have thresholds that can be looked at in determining whether or not to invoke the command.

Furthermore, in comparing the determined position and orientation information with the predetermined position information associated with input commands to see if there is a match, histories of previous frames may be saved or mapped. For example, the frame buffer may be monitored or the system may otherwise keep running records of the history of the previous frames. The previous frames may be looked at to determine if any commands are met. The mapping of frame histories may allow the telemetry of the controller at a specific time to be determined to provide the position orientation in determining if a command is met.

Finally, in step 326 if the determined position information for the controller matches predetermined position information for a command, the command is provided to the system. Such command may be used to cause an event to occur or not occur in a video game or other simulation.

In other embodiments, the movements of a game controller may mapped to game commands, such as for example in video game. With such a method, which may be used in video games or other simulations, position information for a controller that is being manipulated by a user is received. The position information is analyzed to determine whether a predetermined movement of the controller associated with a command has been performed. This analysis may be performed as described above. If the predetermined movement of the controller associated with a command has been performed, then the command is executed by the game. The execution of the command may cause a visual effect or the like to occur on the video display that the game is being displayed on.

While the discussion herein is directed to the use of LEDs on the controller for a game or other entertainment system, it should be well understood that the teachings provided herein may be applied to detect and track the movements of controllers for other types of systems, devices, consumer electronics, etc. That is, the LEDs of the game controller described above can be used to perform remote control functions for consumer electronics devises or any device. LEDs may be used on the controllers for many other types of systems and devices in order to detect and track the controllers so that such movements may be mapped to commands for those systems and device. Examples of such other types of systems and devices may include, but are not limited to, televisions, stereos, telephones, computers, home or office networks, hand-held computing or communication device, etc.

Furthermore, the teachings described herein may be applied to universal remote controls that have the ability to control several or many different devices. That is, such universal remote controls may include LEDs as described herein such that movements of the universal remote control body may be used as input commands for several or many different devices or systems.

Moreover, a game controller may have a universal remote function. For example, such may comprise a body having a forward section to be oriented towards a screen when a progress of a game controlled in accordance with the game controller is displayed upon the screen. At least one input device may be assembled with the body with the input device manipulable by a user to register an input from the user. A signal encoder may be included. An infrared signal transmitter operable to transmit an infrared signal over the air using a signal generated by the signal encoder may be included. The signal encoder may be programmable to encode the signal with a selected one of a plurality of signaling codes for reception by an electronic device having an infrared receiver and a signal decoder operable with the selected one signaling code.

Moreover, battery operated toys (including toys molded into a form and style of a branded game) can be formed having LEDs and form a tracked user manipulated body in the sensed environment.

In some embodiments the image analyzer can recognize a user or process audio authenticated gestures, etc. A user may be identified by an analyzer in the system through a gesture and a gesture may be specific to a user. Gestures may be recorded by users and stored in models. The recordation process may optionally store audio generated during recordation of a gesture. The sensed environment may be sampled into a multi-channel analyzer and processed. The processor may reference gesture models to determine and authenticate user identity or objects based on voice or acoustic patterns and to a high degree of accuracy and performance.

Figure 4:
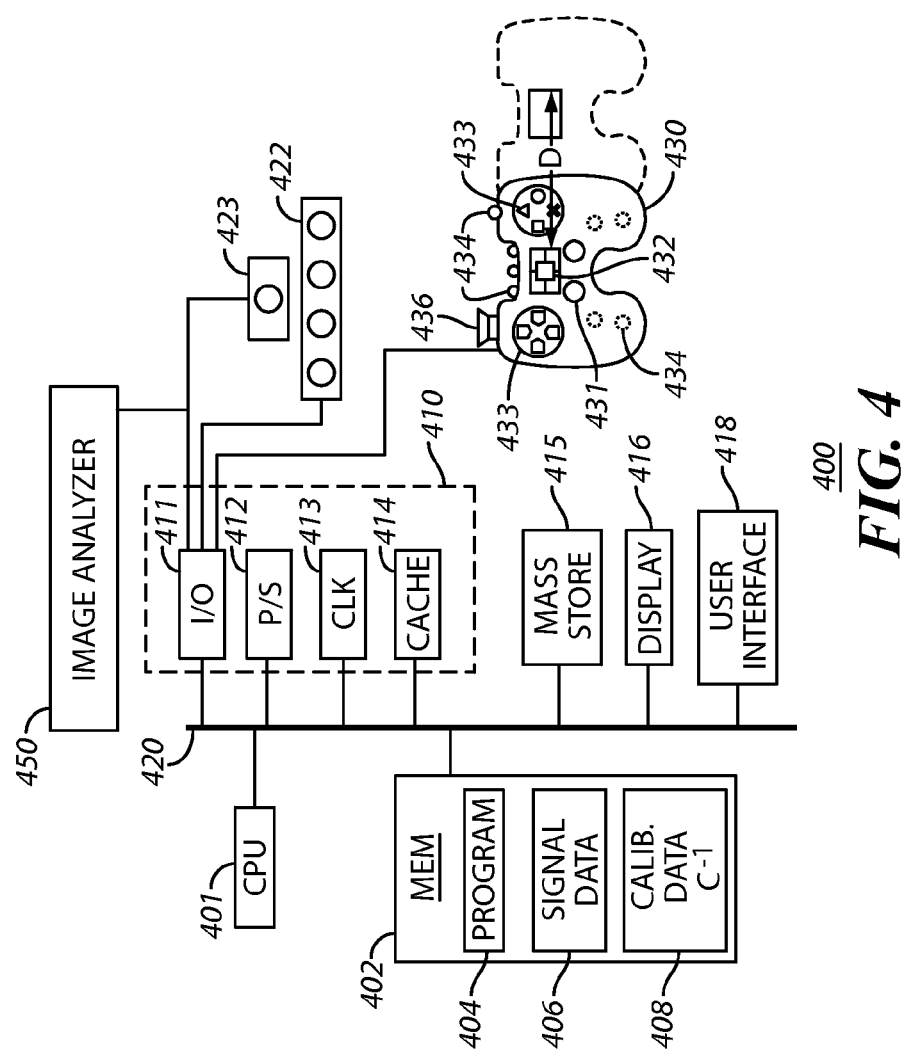
FIG. 4 is a block diagram illustrating a system that may be used to run, implement and/or execute the methods and techniques shown and described herein in accordance with embodiments of the present invention.

According to embodiments of the present invention, the methods and techniques described herein may be implemented as part of a signal processing apparatus 400, as depicted in FIG. 4. The apparatus 400 may include a processor 401 and a memory 402 (e.g., RAM, DRAM, ROM, and the like). In addition, the signal processing apparatus 400 may have multiple processors 401 if parallel processing is to be implemented. The memory 402 may include data and code configured as described above.

Specifically, the memory 402 may include signal data 406. The memory 402 may also contain calibration data 408, e.g., data representing one or more inverse eigenmatrices $C^{-1}$ for one or more corresponding pre-calibrated listening zones obtained from calibration of a microphone array 422. By way of example the memory 402 may contain eigenmatrices for eighteen 20 degree sectors that encompass a microphone array 422.

The apparatus 400 may also include well-known support functions 410, such as input/output (I/O) elements 411, power supplies (P/S) 412, a clock (CLK) 413 and cache 414. The apparatus 400 may optionally include a mass storage device 415 such as a disk drive, CD-ROM drive, tape drive, or the like to store programs and/or data. The controller may also optionally include a display unit 416 and user interface unit 418 to facilitate interaction between the controller 400 and a user. The display unit 416 may be in the form of a cathode ray tube (CRT) or flat panel screen that displays text, numerals, graphical symbols or images. The user interface 418 may include a keyboard, mouse, joystick, light pen or other device. In addition, the user interface 418 may include a microphone, video camera or other signal transducing device to provide for direct capture of a signal to be analyzed. The processor 401, memory 402 and other components of the system 400 may exchange signals (e.g., code instructions and data) with each other via a system bus 420 as shown in FIG. 4.

The microphone array 422 may be coupled to the apparatus 400 through the I/O functions 411. The microphone array may include between about 2 and about 8 microphones, preferably about 4 microphones with neighboring microphones separated by a distance of less than about 4 centimeters, preferably between about 1 centimeter and about 2 centimeters. Preferably, the microphones in the array 422 are omni-directional microphones. An optional image capture unit 423 (e.g., a digital camera) may be coupled to the apparatus 400 through the I/O functions 411. One or more pointing actuators 425 that are mechanically coupled to the camera may exchange signals with the processor 401 via the I/O functions 411.

As used herein, the term I/O generally refers to any program, operation or device that transfers data to or from the system 400 and to or from a peripheral device. Every data transfer may be regarded as an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, such as a CD-ROM drive, CD-R drive or internal modem or other peripheral such as a flash memory reader/writer, hard drive.

In certain embodiments of the invention, the apparatus 400 may be a video game unit, which may include a joystick controller 430 coupled to the processor via the I/O functions 411 either through wires (e.g., a USB cable) or wirelessly. The joystick controller 430 may have analog joystick controls 431 and conventional buttons 433 that provide control signals commonly used during playing of video games. Such video games may be implemented as processor readable data and/or instructions which may be stored in the memory 402 or other processor readable medium such as one associated with the mass storage device 415.

The joystick controls 431 may generally be configured so that moving a control stick left or right signals movement along the X axis, and moving it forward (up) or back (down) signals movement along the Y axis. In joysticks that are configured for three-dimensional movement, twisting the stick left (counter-clockwise) or right (clockwise) may signal movement along the Z axis. These three axis—X Y and Z—are often referred to as roll, pitch, and yaw, respectively, particularly in relation to an aircraft.

In addition to conventional features, the joystick controller 430 may include one or more inertial sensors 432, which may provide position and/or orientation information to the processor 401 via an inertial signal. Orientation information may include angular information such as a tilt, roll or yaw of the joystick controller 430. By way of example, the inertial sensors 432 may include any number and/or combination of accelerometers, gyroscopes or tilt sensors. In a preferred embodiment, the inertial sensors 432 include tilt sensors adapted to sense orientation of the joystick controller with respect to tilt and roll axes, a first accelerometer adapted to sense acceleration along a yaw axis and a second accelerometer adapted to sense angular acceleration with respect to the yaw axis. An accelerometer may be implemented, e.g., as a MEMS device including a mass mounted by one or more springs with sensors for sensing displacement of the mass relative to one or more directions. Signals from the sensors that are dependent on the displacement of the mass may be used to determine an acceleration of the joystick controller 430. Such techniques may be implemented by program code instructions 404 which may be stored in the memory 402 and executed by the processor 401.

By way of example an accelerometer suitable as the inertial sensor 432 may be a simple mass elastically coupled at three or four points to a frame, e.g., by springs. Pitch and roll axes lie in a plane that intersects the frame, which is mounted to the joystick controller 430. As the frame (and the joystick controller 430) rotates about pitch and roll axes the mass will displace under the influence of gravity and the springs will elongate or compress in a way that depends on the angle of pitch and/or roll. The displacement and of the mass can be sensed and converted to a signal that is dependent on the amount of pitch and/or roll. Angular acceleration about the yaw axis or linear acceleration along the yaw axis may also produce characteristic patterns of compression and/or elongation of the springs or motion of the mass that can be sensed and converted to signals that are dependent on the amount of angular or linear acceleration. Such an accelerometer device can measure tilt, roll angular acceleration about the yaw axis and linear acceleration along the yaw axis by tracking movement of the mass or compression and expansion forces of the springs. There are a number of different ways to track the position of the mass and/or or the forces exerted on it, including resistive strain gauge material, photonic sensors, magnetic sensors, hall-effect devices, piezoelectric devices, capacitive sensors, and the like.

In addition, the joystick controller 430 may include one or more light sources 434, such as light emitting diodes (LEDs). The light sources 434 may be used to distinguish one controller from the other. For example one or more LEDs can accomplish this by flashing or holding an LED pattern code. By way of example, 5 LEDs can be provided on the joystick controller 430 in a linear or two-dimensional pattern. Although a linear array of LEDs is preferred, the LEDs may alternatively, be arranged in a rectangular pattern or an arcuate pattern to facilitate determination of an image plane of the LED array when analyzing an image of the LED pattern obtained by the image capture unit 423. Furthermore, the LED pattern codes may also be used to determine the positioning of the joystick controller 430 during game play. For instance, the LEDs can assist in identifying tilt, yaw and roll of the controllers. This detection pattern can assist in providing a better user/feel in games, such as aircraft flying games, etc. The image capture unit 423 may capture images containing the joystick controller 430 and light sources 434. Analysis of such images can determine the location and/or orientation of the joystick controller. Such analysis may be implemented by program code instructions 404 stored in the memory 402 and executed by the processor 401. To facilitate capture of images of the light sources 434 by the image capture unit 423, the light sources 434 may be placed on two or more different sides of the joystick controller 430, e.g., on the front and on the back (as shown in phantom). Such placement allows the image capture unit 423 to obtain images of the light sources 434 for different orientations of the joystick controller 430 depending on how the joystick controller 430 is held by a user.

In addition the light sources 434 may provide telemetry signals to the processor 401, e.g., in pulse code, amplitude modulation or frequency modulation format. Such telemetry signals may indicate which joystick buttons are being pressed and/or how hard such buttons are being pressed. Telemetry signals may be encoded into the optical signal, e.g., by pulse coding, pulse width modulation, frequency modulation or light intensity (amplitude) modulation. The processor 401 may decode the telemetry signal from the optical signal and execute a game command in response to the decoded telemetry signal. Telemetry signals may be decoded from analysis of images of the joystick controller 430 obtained by the image capture unit 423. Alternatively, the apparatus 401 may include a separate optical sensor dedicated to receiving telemetry signals from the lights sources 434. The use of LEDs in conjunction with determining an intensity amount in interfacing with a computer program is described, e.g., in commonly-owned U.S. patent application Ser. No. 11/429,414, to Richard L. Marks et al., entitled "USE OF COMPUTER IMAGE AND AUDIO PROCESSING IN DETERMINING AN INTENSITY AMOUNT WHEN INTERFACING WITH A COMPUTER PROGRAM", which is incorporated herein by reference in its entirety. In addition, analysis of images containing the light sources 434 may be used for both telemetry and determining the position and/or orientation of the joystick controller 430. Such techniques may be implemented by program code instructions 404 which may be stored in the memory 402 and executed by the processor 401.

The processor 401 may use the inertial signals from the inertial sensor 432 in conjunction with optical signals from light sources 434 detected by the image capture unit 423 and/or sound source location and characterization information from acoustic signals detected by the microphone array 422 to deduce information on the location and/or orientation of the joystick controller 430 and/or its user. For example, "acoustic radar" sound source location and characterization may be used in conjunction with the microphone array 422 to track a moving voice while motion of the joystick controller is independently tracked (through the inertial sensor 432 and or light sources 434). Any number of different combinations of different modes of providing control signals to the processor 401 may be used in conjunction with embodiments of the present invention. Such techniques may be implemented by program code instructions 404 which may be stored in the memory 402 and executed by the processor 401.

Signals from the inertial sensor 432 may provide part of a tracking information input and signals generated from the image capture unit 423 from tracking the one or more light sources 434 may provide another part of the tracking information input. By way of example, and without limitation, such "mixed mode" signals may be used in a football type video game in which a Quarterback pitches the ball to the right after a head fake head movement to the left. Specifically, a game player holding the controller 430 may turn his head to the left and make a sound while making a pitch movement swinging the controller out to the right like it was the football. The microphone array 420 in conjunction with "acoustic radar" program code can track the user's voice. The image capture unit 423 can track the motion of the user's head or track other commands that do not require sound or use of the controller. The sensor 432 may track the motion of the joystick controller (representing the football). The image capture unit 423 may also track the light sources 434 on the controller 430. The user may release of the "ball" upon reaching a certain amount and/or direction of acceleration of the joystick controller 430 or upon a key command triggered by pressing a button on the joystick controller 430.

In certain embodiments of the present invention, an inertial signal, e.g., from an accelerometer or gyroscope may be used to determine a location of the joystick controller 430. Specifically, an acceleration signal from an accelerometer may be integrated once with respect to time to determine a change in velocity and the velocity may be integrated with respect to time to determine a change in position. If values of the initial position and velocity at some time are known then the absolute position may be determined using these values and the changes in velocity and position. Although position determination using an inertial sensor may be made more quickly than using the image capture unit 423 and light sources 434 the inertial sensor 432 may be subject to a type of error known as "drift" in which errors that accumulate over time can lead to a discrepancy D between the position of the joystick 430 calculated from the inertial signal (shown in phantom) and the actual position of the joystick controller 430. Embodiments of the present invention allow a number of ways to deal with such errors.

For example, the drift may be cancelled out manually by re-setting the initial position of the joystick controller 430 to be equal to the current calculated position. A user may use one or more of the buttons on the joystick controller 430 to trigger a command to re-set the initial position. Alternatively, image-based drift may be implemented by re-setting the current position to a position determined from an image obtained from the image capture unit 423 as a reference. Such image-based drift compensation may be implemented manually, e.g., when the user triggers one or more of the buttons on the joystick controller 430. Alternatively, image-based drift compensation may be implemented automatically, e.g., at regular intervals of time or in response to game play. Such techniques may be implemented by program code instructions 404 which may be stored in the memory 402 and executed by the processor 401.

In certain embodiments it may be desirable to compensate for spurious data in the inertial sensor signal. For example the signal from the inertial sensor 432 may be oversampled and a sliding average may be computed from the oversampled signal to remove spurious data from the inertial sensor signal. In some situations it may be desirable to oversample the signal and reject a high and/or low value from some subset of data points and compute the sliding average from the remaining data points. Furthermore, other data sampling and manipulation techniques may be used to adjust the signal from the inertial sensor to remove or reduce the significance of spurious data. The choice of technique may depend on the nature of the signal, computations to be performed with the signal, the nature of game play or some combination of two or more of these. Such techniques may be implemented by program code instructions 404 which may be stored in the memory 402 and executed by the processor 401.

The processor 401 may perform digital signal processing on signal data 406 in response to the data 406 and program code instructions of a program 404 stored and retrieved by the memory 402 and executed by the processor module 401. Code portions of the program 404 may conform to any one of a number of different programming languages such as Assembly, C++, JAVA or a number of other languages. The processor module 401 forms a general-purpose computer that becomes a specific purpose computer when executing programs such as the program code 404. Although the program code 404 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

In one embodiment, among others, the program code 404 may include a set of processor readable instructions that implement any one or more of the methods and techniques described herein or some combination of two or more of such methods and techniques. For example, the program code 404 may be configured to implement the image analyzer function described herein. Or alternatively, the image analyzer function described herein may be implemented in hardware.

In the illustrated embodiment the image analyzer function described above is illustrated as the image analyzer 450. The image analyzer 450 may receive its input from a camera, such as for example the image capture unit 423 or the camera 112 (FIG. 1A). Thus, the output of the video camera 112 or the image capture unit 423 may be coupled to the input of the image analyzer 450. The output of the image analyzer 450 may be provided to the system of the apparatus 400. This way, either commands themselves or information needed to see if a command or gesture has been recognized is provided to the apparatus 400. The image analyzer 450 may be coupled to the rest of the apparatus 400 in many different ways; as such, the illustrated connections are just one example. As another example, the image analyzer 450 may be coupled to the system bus 420, which will allow it to receive its input data from the image capture unit 423 and provide its output to the apparatus 400.

The image analyzer 450 may optionally be included in the apparatus 400 or the entertainment system or console 102, or the image analyzer 450 may be located separately from these devices and systems. And again, it should be well understood that the image analyzer 450 may be implemented, in whole or in part, in software, hardware or some combination of both. In the scenario where the image analyzer 450 is implemented in software, then the block 450 represents the image analyzer function implemented in software.

The program code 404 may generally include one or more instructions that direct the one or more processors to select a pre-calibrated listening zone at runtime and filter out sounds originating from sources outside the pre-calibrated listening zone. The pre-calibrated listening zones may include a listening zone that corresponds to a volume of focus or field of view of the image capture unit 423.

The program code may include one or more instructions which, when executed, cause the apparatus 400 to select a pre-calibrated listening sector that contains a source of sound. Such instructions may cause the apparatus to determine whether a source of sound lies within an initial sector or on a particular side of the initial sector. If the source of sound does not lie within the default sector, the instructions may, when executed, select a different sector on the particular side of the default sector. The different sector may be characterized by an attenuation of the input signals that is closest to an optimum value. These instructions may, when executed, calculate an attenuation of input signals from the microphone array 422 and the attenuation to an optimum value. The instructions may, when executed, cause the apparatus 400 to determine a value of an attenuation of the input signals for one or more sectors and select a sector for which the attenuation is closest to an optimum value.

The program code 404 may optionally include one or more instructions that direct the one or more processors to produce a discrete time domain input signal $x_m(t)$ from the microphones $M_0 \ldots M_M$, determine a listening sector, and use the listening sector in a semi-blind source separation to select the finite impulse response filter coefficients to separate out different sound sources from input signal $x_m(t)$. The program 404 may also include instructions to apply one or more fractional delays to selected input signals $x_m(t)$ other than an input signal $x_0(t)$ from a reference microphone $M_0$. Each fractional delay may be selected to optimize a signal to noise ratio of a discrete time domain output signal $y(t)$ from the microphone array. The fractional delays may be selected to such that a signal from the reference microphone $M_0$ is first in time relative to signals from the other microphone(s) of the array. The program 404 may also include instructions to introduce a fractional time delay $\Delta$ into an output signal $y(t)$ of the microphone array so that: $y(t+\Delta)=x(t+\Delta)*b_0+x(t-1+\Delta)*b_1+x(t-2+\Delta)*b_2+ \ldots +x(t-N+\Delta)b_N$, where $\Delta$ is between zero and ±1.

The program code 404 may optionally include processor executable instructions including one or more instructions which, when executed cause the image capture unit 423 to monitor a field of view in front of the image capture unit 423, identify one or more of the light sources 434 within the field of view, detect a change in light emitted from the light source(s) 434; and in response to detecting the change, triggering an input command to the processor 401. The use of LEDs in conjunction with an image capture device to trigger actions in a game controller is described e.g., in commonly-owned, U.S. patent application Ser. No. 10/759,782 to Richard L. Marks, filed Jan. 16, 2004 and entitled: METHOD AND APPARATUS FOR LIGHT INPUT DEVICE, which is incorporated herein by reference in its entirety.

The program code 404 may optionally include processor executable instructions including one or more instructions which, when executed, use signals from the inertial sensor and signals generated from the image capture unit from tracking the one or more light sources as inputs to a game system, e.g., as described above. The program code 404 may optionally include processor executable instructions including one or more instructions which, when executed compensate for drift in the inertial sensor 432.

In addition, the program code 404 may optionally include processor executable instructions including one or more instructions which, when executed adjust the gearing and mapping of controller manipulations to game a environment. Such a feature allows a user to change the "gearing" of manipulations of the joystick controller 430 to game state. For example, a 45 degree rotation of the joystick controller 430 may be geared to a 45 degree rotation of a game object. However this 1:1 gearing ratio may be modified so that an X degree rotation (or tilt or yaw or "manipulation") of the controller translates to a Y rotation (or tilt or yaw or "manipulation") of the game object. Gearing may be 1:1 ratio, 1:2 ratio, 1:X ratio or X:Y ratio, where X and Y can take on arbitrary values. Additionally, mapping of input channel to game control may also be modified over time or instantly. Modifications may comprise changing gesture trajectory models, modifying the location, scale, threshold of gestures, etc. Such mapping may be programmed, random, tiered, staggered, etc., to provide a user with a dynamic range of manipulatives. Modification of the mapping, gearing or ratios can be adjusted by the program code 404 according to game play, game state, through a user modifier button (key pad, etc.) located on the joystick controller 430, or broadly in response to the input channel. The input channel may include, but may not be limited to elements of user audio, audio generated by controller, tracking audio generated by the controller, controller button state, video camera output, controller telemetry data, including accelerometer data, tilt, yaw, roll, position, acceleration and any other data from sensors capable of tracking a user or the user manipulation of an object.

In certain embodiments the program code 404 may change the mapping or gearing over time from one scheme or ratio to another scheme, respectively, in a predetermined time-dependent manner. Gearing and mapping changes can be applied to a game environment in various ways. In one example, a video game character may be controlled under one gearing scheme when the character is healthy and as the character's health deteriorates the system may gear the controller commands so the user is forced to exacerbate the movements of the controller to gesture commands to the character. A video game character who becomes disoriented may force a change of mapping of the input channel as users, for example, may be required to adjust input to regain control of the character under a new mapping. Mapping schemes that modify the translation of the input channel to game commands may also change during gameplay. This translation may occur in various ways in response to game state or in response to modifier commands issued under one or more elements of the input channel. Gearing and mapping may also be configured to influence the configuration and/or processing of one or more elements of the input channel.

In addition, a speaker 436 may be mounted to the joystick controller 430. In "acoustic radar" embodiments wherein the program code 404 locates and characterizes sounds detected with the microphone array 422, the speaker 436 may provide an audio signal that can be detected by the microphone array 422 and used by the program code 404 to track the position of the joystick controller 430. The speaker 436 may also be used to provide an additional "input channel" from the joystick controller 430 to the processor 401. Audio signals from the speaker 436 may be periodically pulsed to provide a beacon for the acoustic radar to track location. The audio signals (pulsed or otherwise) may be audible or ultrasonic. The acoustic radar may track the user manipulation of the joystick controller 430 and where such manipulation tracking may include information about the position and orientation (e.g., pitch, roll or yaw angle) of the joystick controller 430. The pulses may be triggered at an appropriate duty cycle as one skilled in the art is capable of applying. Pulses may be initiated based on a control signal arbitrated from the system. The apparatus 400 (through the program code 404) may coordinate the dispatch of control signals amongst two or more joystick controllers 430 coupled to the processor 401 to assure that multiple controllers can be tracked.

Figure 5:
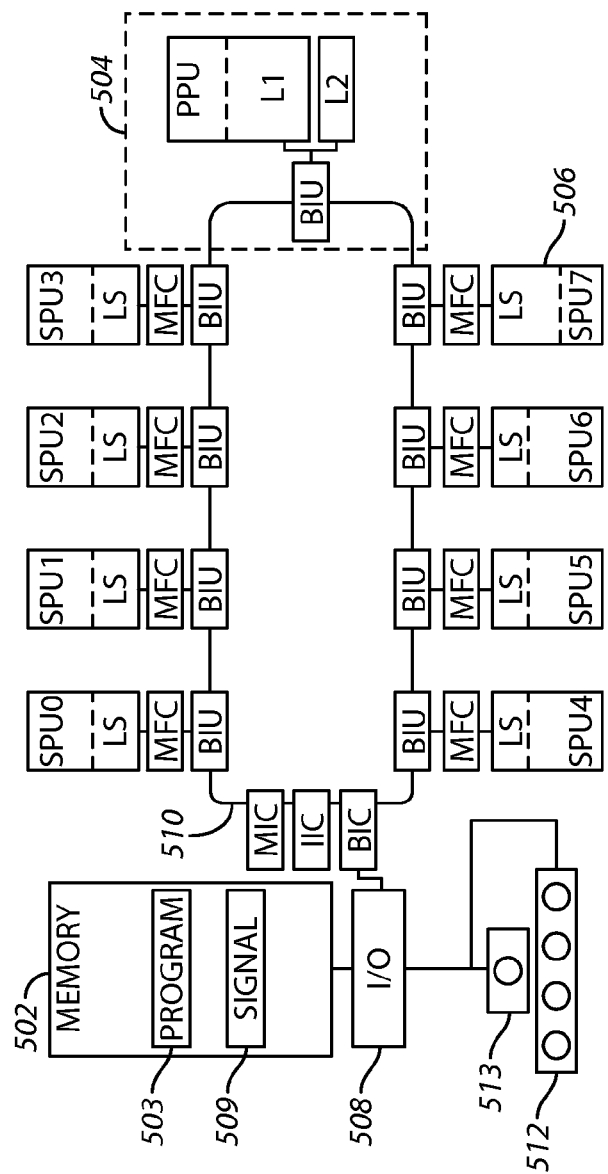
FIG. 5 is a block diagram illustrating a processor that may be used to run, implement and/or execute the methods and techniques shown and described herein in accordance with embodiments of the present invention.

By way of example, embodiments of the present invention may be implemented on parallel processing systems. Such parallel processing systems typically include two or more processor elements that are configured to execute parts of a program in parallel using separate processors. By way of example, and without limitation, FIG. 5 illustrates a type of cell processor 500 according to an embodiment of the present invention. The cell processor 500 may be used as the processor 401 of FIG. 4. In the example depicted in FIG. 5, the cell processor 500 includes a main memory 502, power processor element (PPE) 504, and a number of synergistic processor elements (SPEs) 506. In the example depicted in FIG. 5, the cell processor 500 includes a single PPE 504 and eight SPE 506. In such a configuration, seven of the SPE 506 may be used for parallel processing and one may be reserved as a back-up in case one of the other seven fails. A cell processor may alternatively include multiple groups of PPEs (PPE groups) and multiple groups of SPEs (SPE groups). In such a case, hardware resources can be shared between units within a group. However, the SPEs and PPEs must appear to software as independent elements. As such, embodiments of the present invention are not limited to use with the configuration shown in FIG. 5.

The main memory 502 typically includes both general-purpose and nonvolatile storage, as well as special-purpose hardware registers or arrays used for functions such as system configuration, data-transfer synchronization, memory-mapped I/O, and I/O subsystems. In embodiments of the present invention, a signal processing program 503 may be resident in main memory 502. The signal processing program 503 may run on the PPE. The program 503 may be divided up into multiple signal processing tasks that can be executed on the SPEs and/or PPE.

By way of example, the PPE 504 may be a 64-bit PowerPC Processor Unit (PPU) with associated caches L1 and L2. The PPE 504 is a general-purpose processing unit, which can access system management resources (such as the memory-protection tables, for example). Hardware resources may be mapped explicitly to a real address space as seen by the PPE. Therefore, the PPE can address any of these resources directly by using an appropriate effective address value. A primary function of the PPE 504 is the management and allocation of tasks for the SPEs 506 in the cell processor 500.

Although only a single PPE is shown in FIG. 5, some cell processor implementations, such as cell broadband engine architecture (CBEA), the cell processor 500 may have multiple PPEs organized into PPE groups, of which there may be more than one. These PPE groups may share access to the main memory 502. Furthermore the cell processor 500 may include two or more groups SPEs. The SPE groups may also share access to the main memory 502. Such configurations are within the scope of the present invention.

Each SPE 506 is includes a synergistic processor unit (SPU) and its own local storage area LS. The local storage LS may include one or more separate areas of memory storage, each one associated with a specific SPU. Each SPU may be configured to only execute instructions (including data load and data store operations) from within its own associated local storage domain. In such a configuration, data transfers between the local storage LS and elsewhere in a system 500 may be performed by issuing direct memory access (DMA) commands from the memory flow controller (MFC) to transfer data to or from the local storage domain (of the individual SPE). The SPUs are less complex computational units than the PPE 504 in that they do not perform any system management functions. The SPU generally have a single instruction, multiple data (SIMD) capability and typically process data and initiate any required data transfers (subject to access properties set up by the PPE) in order to perform their allocated tasks. The purpose of the SPU is to enable applications that require a higher computational unit density and can effectively use the provided instruction set. A significant number of SPEs in a system managed by the PPE 504 allow for cost-effective processing over a wide range of applications.

Each SPE 506 may include a dedicated memory flow controller (MFC) that includes an associated memory management unit that can hold and process memory-protection and access-permission information. The MFC provides the primary method for data transfer, protection, and synchronization between main storage of the cell processor and the local storage of an SPE. An MFC command describes the transfer to be performed. Commands for transferring data are sometimes referred to as MFC direct memory access (DMA) commands (or MFC DMA commands).

Each MFC may support multiple DMA transfers at the same time and can maintain and process multiple MFC commands. Each MFC DMA data transfer command request may involve both a local storage address (LSA) and an effective address (EA). The local storage address may directly address only the local storage area of its associated SPE. The effective address may have a more general application, e.g., it may be able to reference main storage, including all the SPE local storage areas, if they are aliased into the real address space.

To facilitate communication between the SPEs 506 and/or between the SPEs 506 and the PPE 504, the SPEs 506 and PPE 504 may include signal notification registers that are tied to signaling events. The PPE 504 and SPEs 506 may be coupled by a star topology in which the PPE 504 acts as a router to transmit messages to the SPEs 506. Alternatively, each SPE 506 and the PPE 504 may have a one-way signal notification register referred to as a mailbox. The mailbox can be used by an SPE 506 to host operating system (OS) synchronization.

The cell processor 500 may include an input/output (I/O) function 508 through which the cell processor 500 may interface with peripheral devices, such as a microphone array 512 and optional image capture unit 513. In addition an Element Interconnect Bus 510 may connect the various components listed above. Each SPE and the PPE can access the bus 510 through a bus interface units BIU. The cell processor 500 may also includes two controllers typically found in a processor: a Memory Interface Controller MIC that controls the flow of data between the bus 510 and the main memory 502, and a Bus Interface Controller BIC, which controls the flow of data between the I/O 508 and the bus 510. Although the requirements for the MIC, BIC, BIUs and bus 510 may vary widely for different implementations, those of skill in the art will be familiar their functions and circuits for implementing them.

The cell processor 500 may also include an internal interrupt controller IIC. The IIC component manages the priority of the interrupts presented to the PPE. The IIC allows interrupts from the other components the cell processor 500 to be handled without using a main system interrupt controller. The IIC may be regarded as a second level controller. The main system interrupt controller may handle interrupts originating external to the cell processor.

In embodiments of the present invention, certain computations, such as fractional delays, may be performed in parallel using the PPE 504 and/or one or more of the SPE 506. Each fractional delay calculation may be run as one or more separate tasks that different SPE 506 may take as they become available.

While the invention herein disclosed has been described by means of specific embodiments and applications thereof, numerous modifications and variations could be made thereto by those skilled in the art without departing from the scope of the invention set forth in the claims.

What is claimed is:

1. A method for use in a game, comprising the steps of:
    in a system that comprises a processor, a controller in communication with the processor, and an image capture unit in communication with the processor, with the controller comprising a type of controller that is manipulatable by a user and that includes an inertial sensor in the controller, and with the image capture unit being positioned so that the controller is viewable by the image capture unit,
    the processor receiving position information for the controller that is being manipulated by the user, wherein at least a portion of the position information is obtained from the inertial sensor in the controller, and wherein the portion of the position information comprises a current calculated position of the controller obtained from the inertial sensor, and wherein the inertial sensor is subject to a drift error that causes a discrepancy between the current calculated position of the controller obtained from the inertial sensor and an actual position of the controller;
    the processor compensating for the drift error in the inertial sensor by re-setting the current calculated position of the controller in the position information to a position determined from an image obtained from the image capture unit, wherein the re-setting is performed in response to the user triggering one or more input devices on the controller;
    the processor analyzing the position information that includes the current calculated position of the controller that has been re-set to a position determined from an image obtained from the image capture unit to determine whether a predetermined movement of the controller associated with a command has been performed; and
    the processor executing the command if the predetermined movement of the controller associated with the command has been performed.

2. A method in accordance with claim 1, further comprising the step of:
    generating an interrupt for the game if the predetermined movement of the controller associated with the command has been performed.

3. A method in accordance with claim 1, wherein the step of analyzing comprises the step of:
    determining whether the position information for the controller indicates that it has fallen within certain ranges associated with the predetermined movement of the controller associated with a command.

4. A method in accordance with claim 1, further comprising the step of:
    receiving on an image plane of a camera a projection of a geometric shape established on the controller.

5. A method in accordance with claim 4, further comprising the step of:
    analyzing movements and deformities in the projection of the geometric shape.

6. A computer program product comprising a non-transitory medium for embodying a computer program for input to a computer system and a computer program embodied in the non-transitory medium for causing the computer system to perform steps comprising:
    with the computer system comprising a processor, a controller in communication with the processor, and an image capture unit in communication with the processor, with the controller comprising a type of controller that is manipulatable by a user and that includes an inertial sensor in the controller, and with the image capture unit being positioned so that the controller is viewable by the image capture unit,
    the processor receiving position information for the controller that is being manipulated by the user, wherein at least a portion of the position information is obtained from the inertial sensor in the controller, and wherein the portion of the position information comprises a current calculated position of the controller obtained from the inertial sensor, and wherein the inertial sensor is subject to a drift error that causes a discrepancy between the current calculated position of the controller obtained from the inertial sensor and an actual position of the controller;
    the processor compensating for the drift error in the inertial sensor by re-setting the current calculated position of the controller in the position information to a position determined from an image obtained from the image capture unit, wherein the re-setting is performed in response to the user triggering one or more input devices on the controller;
    the processor analyzing the position information that includes the current calculated position of the controller that has been re-set to a position determined from an image obtained from the image capture unit to determine whether a predetermined movement of the controller associated with a command has been performed; and
    the processor executing the command if the predetermined movement of the controller associated with the command has been performed.

7. A computer program product in accordance with claim 6, wherein the computer program embodied in the non-transitory medium is further configured for causing the computer system to perform a step comprising:
    generating an interrupt for the game if the predetermined movement of the controller associated with the command has been performed.

8. A computer program product in accordance with claim 6, wherein the step of analyzing comprises the step of:
    determining whether the position information for the controller indicates that it has fallen within certain ranges associated with the predetermined movement of the controller associated with a command.

9. A computer program product in accordance with claim 6, wherein the computer program embodied in the non-transitory medium is further configured for causing the computer system to perform a step comprising:
    receiving on an image plane of a camera a projection of a geometric shape established on the controller.

10. A computer program product in accordance with claim 9, wherein the computer program embodied in the non-transitory medium is further configured for causing the computer system to perform a step comprising:

analyzing movements and deformities in the projection of the geometric shape.

11. A system comprising:
a processor;
a controller in communication with the processor, with the controller comprising a type of controller that is manipulatable by a user and that includes an inertial sensor in the controller; and
an image capture unit in communication with the processor, with the image capture unit being positioned so that the controller is viewable by the image capture unit;
wherein the processor is configured to execute steps comprising:
receiving position information for the controller that is being manipulated by the user, wherein at least a portion of the position information is obtained from the inertial sensor in the controller, and wherein the portion of the position information comprises a current calculated position of the controller obtained from the inertial sensor, and wherein the inertial sensor is subject to a drift error that causes a discrepancy between the current calculated position of the controller obtained from the inertial sensor and an actual position of the controller;
compensating for the drift error in the inertial sensor by re-setting the current calculated position of the controller in the position information to a position determined from an image obtained from the image capture unit, wherein the re-setting is performed in response to the user triggering one or more input devices on the controller;
analyzing the position information that includes the current calculated position of the controller that has been re-set to a position determined from an image obtained from the image capture unit to determine whether a predetermined movement of the controller associated with a command has been performed; and
executing the command if the predetermined movement of the controller associated with the command has been performed.

* * * * *